(12) United States Patent
Kudo

(10) Patent No.: US 7,969,837 B2
(45) Date of Patent: *Jun. 28, 2011

(54) DUBBING DEVICE FOR DUBBING DATA

(75) Inventor: Shigetaka Kudo, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/688,433

(22) Filed: Jan. 15, 2010

(65) Prior Publication Data

US 2010/0165814 A1    Jul. 1, 2010

Related U.S. Application Data

(63) Continuation of application No. 11/974,123, filed on Oct. 11, 2007, now Pat. No. 7,672,203, which is a continuation of application No. 10/257,697, filed as application No. PCT/JP02/01322 on Feb. 15, 2002, now Pat. No. 7,327,645.

(30) Foreign Application Priority Data

Feb. 16, 2001  (JP) .................................. 2001-039994

(51) Int. Cl.
G11B 7/00  (2006.01)
(52) U.S. Cl. ...................................... 369/47.12; 369/84
(58) Field of Classification Search ................. 369/47.12
See application file for complete search history.

(56) References Cited

U.S. PATENT DOCUMENTS

| | | | |
|---|---|---|---|
| 5,485,447 A | 1/1996 | Minoda | |
| 6,594,212 B2 | 7/2003 | Kimura et al. | |
| 6,781,935 B1 | 8/2004 | Kori et al. | |
| 6,804,181 B2 | 10/2004 | Fujisawa et al. | |
| 6,810,200 B1 * | 10/2004 | Aoyama et al. | 386/94 |
| 6,937,553 B1 * | 8/2005 | Mitui et al. | 369/84 |
| 7,307,934 B1 | 12/2007 | Miyazaki | |
| 7,327,645 B2 * | 2/2008 | Kudo | 369/47.12 |
| 7,373,521 B1 * | 5/2008 | Kawahara | 713/193 |
| 7,672,203 B2 * | 3/2010 | Kudo | 369/47.12 |
| 2002/0085461 A1 | 7/2002 | Sugiyama | |
| 2002/0188461 A1 | 12/2002 | Matsumoto | |

FOREIGN PATENT DOCUMENTS

| | | |
|---|---|---|
| JP | 62 229589 | 10/1987 |
| JP | 63 026889 | 2/1988 |
| JP | 03 076082 | 4/1991 |

(Continued)

*Primary Examiner* — Lixi Chow

(74) *Attorney, Agent, or Firm* — Frommer Lawrence & Haug LLP; William S. Frommer; Thomas F. Presson

(57) ABSTRACT

The present invention is a dubbing device for dubbing data from a portable first recording medium such as a CD-DA (compact disc digital audio) to a second recording medium such as a hard disk drive (HDD), in which dubbing to the second recording medium with a large capacity is automatically carried out when reproducing data from the first recording medium. When data is reproduced from the first recording medium, database means is searched on the basis of identification information for the first recording medium and execution control of dubbing is performed in accordance with the result of search for recording history information. For example, whether or not data to be reproduced from the first recording medium has been already recorded on the second recording medium is discriminated, and dubbing is carried out if the data to be reproduced data has not been recorded on the second recording medium.

4 Claims, 19 Drawing Sheets

FOREIGN PATENT DOCUMENTS

| | | |
|---|---|---|
| JP | 05 128639 | 5/1993 |
| JP | 8 315548 | 11/1996 |
| JP | 10-162508 | 6/1998 |
| JP | 11-234615 | 8/1999 |
| JP | 2000 113651 | 4/2000 |
| JP | 2000-200475 | 7/2000 |
| JP | 2001-143369 | 5/2001 |
| JP | 2001-189048 | 7/2001 |
| JP | 2002-63762 | 2/2002 |
| WO | WO 0049511 A1 * | 8/2000 |

* cited by examiner

| FRAME | SUBCORDING FRAME | | | | | | |
|---|---|---|---|---|---|---|---|
| 98n+1 | SYNCHRONOUS PATTERN | | | | | | |
| 98n+2 | SYNCHRONOUS PATTERN | | | | | | |
| 98n+3 | P1 | Q1 | R1 | S1 | T1 | U1 | V1 | W1 |
| 98n+4 | P2 | Q2 | R2 | S2 | T2 | U2 | V2 | W2 |
| ⋮ | ⋮ | ⋮ | ⋮ | ⋮ | ⋮ | ⋮ | ⋮ | ⋮ |
| 98n+97 | P95 | Q95 | R95 | S95 | T95 | U95 | V95 | W95 |
| 98n+98 | P96 | Q96 | R96 | S96 | T96 | U96 | V96 | W96 |
| 98(n+1)+1 | | | | | | | |

FIG.6A

| Q1~Q4 | Q5~Q8 | Q9~Q80 | Q81~Q96 |
|---|---|---|---|
| CONTROL | ADR | SUB-Q DATA | CRC |

FIG.6B

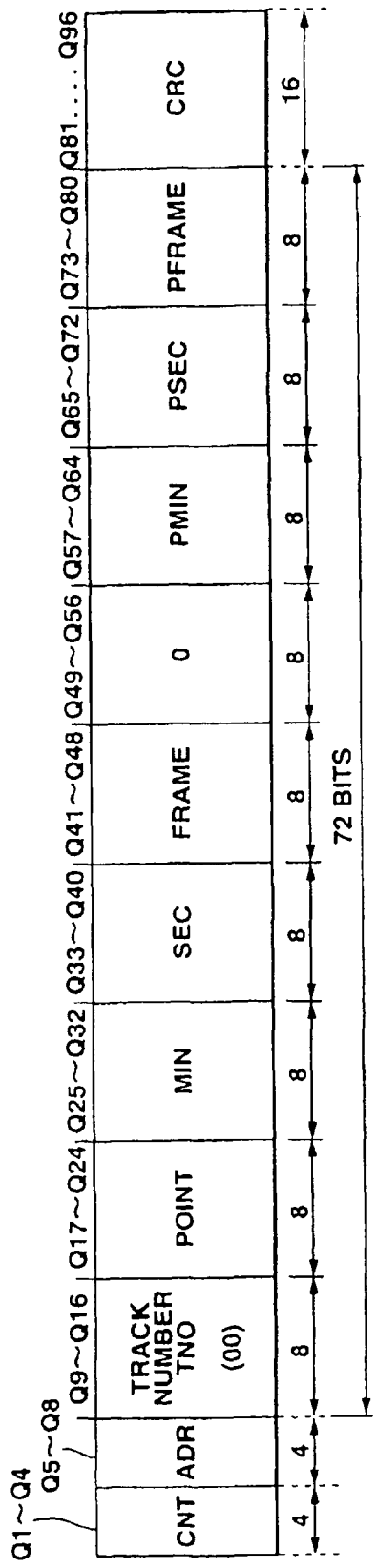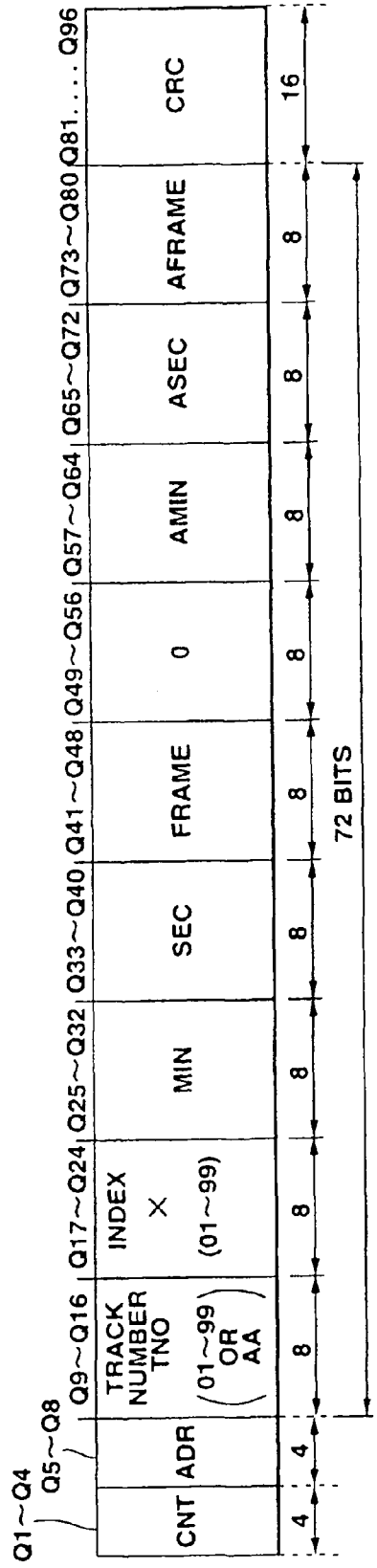

| TNO | BLOCK No. | POINT | PMIN, PSEC, PFRAME | |
|---|---|---|---|---|
| 00 | n | 01 | 00. 02. 32 | START POINT OF TRACK #1 |
| | n+1 | 01 | 00. 02. 32 | |
| | n+2 | 01 | 00. 02. 32 | |
| | n+3 | 02 | 10. 15. 12 | START POINT OF TRACK #2 |
| | n+4 | 02 | 10. 15. 12 | |
| | n+5 | 02 | 10. 15. 12 | |
| | n+6 | 03 | 16. 28. 63 | START POINT OF TRACK #3 |
| | n+7 | 03 | 16. 28. 63 | |
| | n+8 | 03 | 16. 28. 63 | |
| | n+9 | 04 | 20. 15. 00 | START POINT OF TRACK #4 |
| | n+10 | 04 | 20. 15. 00 | |
| | n+11 | 04 | 20. 15. 00 | |
| | n+12 | 05 | 36. 00. 74 | START POINT OF TRACK #5 |
| | n+13 | 05 | 36. 00. 74 | |
| | n+14 | 05 | 36. 00. 74 | |
| | n+15 | 06 | 49. 10. 03 | START POINT OF TRACK #6 |
| | n+16 | 06 | 49. 10. 03 | |
| | n+17 | 06 | 49. 10. 03 | |
| | n+18 | A0 | 01. 00. 00 | TRACK NUMBER OF FIRST TRACK OF DISC |
| | n+19 | A0 | 01. 00. 00 | |
| | n+20 | A0 | 01. 00. 00 | |
| | n+21 | A1 | 06. 00. 00 | TRACK NUMBER OF LAST TRACK OF DISC |
| | n+22 | A1 | 06. 00. 00 | |
| | n+23 | A1 | 06. 00. 00 | |
| | n+24 | A2 | 52. 48. 41 | START POINT OF LEAD-OUT TRACK |
| | n+25 | A2 | 52. 48. 41 | |
| 00 | n+26 | A2 | 52. 48. 41 | |
| 00 | n+27 | 01 | 00. 02. 32 | REPEAT |
| | n+28 | 01 | 00. 02. 32 | |
| | · | · | · · | |
| | · | · | · · | |
| | · | · | · · | |

FIG.8

| TRACK NUMBER | MINUTE (PMIN) | SECOND (PSEC) | FRAME (PFRAME) | RECORDING FLAG | TRACK ADDITIONAL INFORMATION | DISC ADDITIONAL INFORMATION |
|---|---|---|---|---|---|---|
| 1 | 0 | 2 | 32 | | | ⋮ ⋮ |
| 2 | 10 | 15 | 12 | 1 | ⋮ ⋮ | |
| 3 | 16 | 28 | 63 | | | |
| 4 | 20 | 15 | 0 | 1 | | |
| 5 | 36 | 0 | 74 | | | |
| 6 | 49 | 10 | 3 | 1 | | |

DID

FIG.9

DUBBING DEVICE FOR DUBBING DATA

This is a continuation of application Ser. No. 11/974,123, filed Oct. 11, 2007, now U.S. Pat. No. 7,672,203 which is a continuation of application Ser. No. 10/257,697, filed Jun. 16, 2003 now U.S. Pat. No. 7,327,645, which is based on International Application PCT/JP02/01322 filed Feb. 15, 2002, pursuant to 35 USC 371, and is entitled to the priority filing date of Japanese application 2001-039994 filed on Feb. 16, 2001, the entirety of which is incorporated herein by reference.

TECHNICAL FIELD

This invention relates to a dubbing device for dubbing data from a first portable recording medium such as a CD-DA (compact disc digital audio) to a second recording medium such as a hard disk drive (HDD).

BACKGROUND ART

As equipments which support recording media having audio data recorded thereon, CD players, and MD (Mini Disc) recorder/players using a magneto-optical disc with a diameter of 64 mm as a recording medium have been popularized.

For dubbing of audio data or the like on the user side, for example, an operation to dub a tune recorded on a CD is carried out.

The dubbing function in a conventional audio equipment is performed as a user intentionally carries out the operation to record data of a CD to another medium. That is, the user selects a CD or a tune recorded on a CD to be dubbed to an MD or the like, selects an MD to be used for recording, loads the selected CD and MD, and carries out the dubbing operation. The dubbing desired by the user is thus performed.

On the other hand, dubbing is not performed unless the user carries out any operation for dubbing. For example, if the device automatically dubs music to an MD loaded thereon when reproducing music from a CD, it is inconvenient for the user. That is, dubbing an unwanted tune and hence consuming the recording capacity of the MD without the user's knowing must be avoided.

However, as recording media used in audio systems are diversified and their recording capacities are increased, a new operation for the dubbing function is required. For example, if a recording medium on the dubbing destination side has a very large recording capacity, automatic dubbing by the device without user's operation will not be inconvenient for the user.

DISCLOSURE OF THE INVENTION

In view of the foregoing status of the art, it is an object of the present invention to realize automatic dubbing without requiring any operation by the user in a dubbing device for dubbing data from a first portable recording medium such as a CD-DA to a second recording medium having a very large capacity such as a hard disk drive (HDD), and thus improve the usability for the user.

A dubbing device according to the present invention comprises: reproducing means for carrying out reproduction from a portable first recording medium; recording/reproducing means for carrying out recording to and reproduction from a second recording medium having a larger capacity than the first recording medium; database means for managing identification information and recording history information to the second recording medium, with respect to the first recording medium from which reproduction is carried out by the reproducing means; and control means for performing control to search the database means on the basis of the identification information for the first recording medium when reproduction from the first recording medium is carried out by the reproducing means, and to cause the recording/reproducing means to record data reproduced from the first recording medium to the second recording medium in accordance with the result of the search for recording history information.

The control means performs control to discriminate whether or not the data reproduced from the first recording medium has already been recorded on the second recording medium on the basis of the recording history information, and to cause the reproduced data to be recorded to the second recording medium if the reproduced data has not been recorded on the second recording medium.

One or a plurality of programs (tracks of tunes or the like) and management information for managing the programs are recorded on the first recording medium, and the identification information is generated on the basis of the management information.

One or a plurality of programs and management information of managing the programs are recorded on the first recording medium, and the recording history information indicates the presence/absence of recording of each program to the second recording medium.

In this case, the control means performs control to discriminate whether or not each program reproduced from the first recording medium has already been recorded on the second recording medium on the basis of the recording history information, and to cause a program which has not been recorded on the second recording medium to be recorded to the second recording medium.

If a whole program is recorded to the second recording medium, the content of the recording history information is updated to assume that the program has been recorded.

The reproducing means can change its reproducing status from a normal reproducing status to a special reproducing status at the time of data reproduction, and when the reproduction by the reproducing means is changed to the special reproducing status, the control means stops the recording operation which is being carried out by the recording/reproducing means.

Particularly, in the case where the reproducing means can change its reproducing status from the normal reproducing status to the special reproducing status, when the reproduction of a program by the reproducing means is changed to the special reproducing status, the control means stops the recording operation of the program which is being carried out by the recording/reproducing means and erases data of the program which was recorded before the stop of the recording operation.

Moreover, additional information associated with the first recording medium is recorded in the database.

In the dubbing device according to the present invention, when reproduction from the first recording medium is carried out, the program recorded on the first recording medium is automatically dubbed to the second recording medium.

By preventing a program which is recorded on the first recording medium and dubbed once from being dubbed again to the second recording medium, an unnecessary dubbing operation and unnecessary consumption of the capacity of the second recording medium are eliminated.

Furthermore, if the special reproducing status, for example, FF (fast-forward), REW (rewind), or AMS (automatic music sensor), is carried out when reproducing a program (tune or the like) from the first recording medium and the status of the reproduced data is changed to disturb dubbing of the complete data, the dubbing is stopped and the incomplete data which has been dubbed halfway is erased, thereby preventing the incomplete data from remaining as the dubbed data.

Thus, automatic dubbing is carried out without causing any inconvenience to the user and the dubbed data is made available to the user, thus improving the usability.

The other objects of the present invention and specific advantages provided by the present invention will be clarified further from the following description of an embodiment.

BRIEF DESCRIPTION OF THE DRAWINGS

FIGS. 6A and 6B are explanatory views showing a subcoding frame of the CD format.

FIGS. 7A and 7B are explanatory views showing sub-Q data of the CD format.

FIG. 8 illustrates a TOC structure of the CD format.

FIG. 9 shows a database structure of the dubbing device according to the present invention.

BEST MODE FOR CARRYING OUT THE INVENTION

Hereinafter, an embodiment will be described in which the present invention is applied to a dubbing device for automatically dubbing to an HDD a program to be reproduced from a CD, that is, music data, which is also called track. The description is made in the following order.

Figure 1:
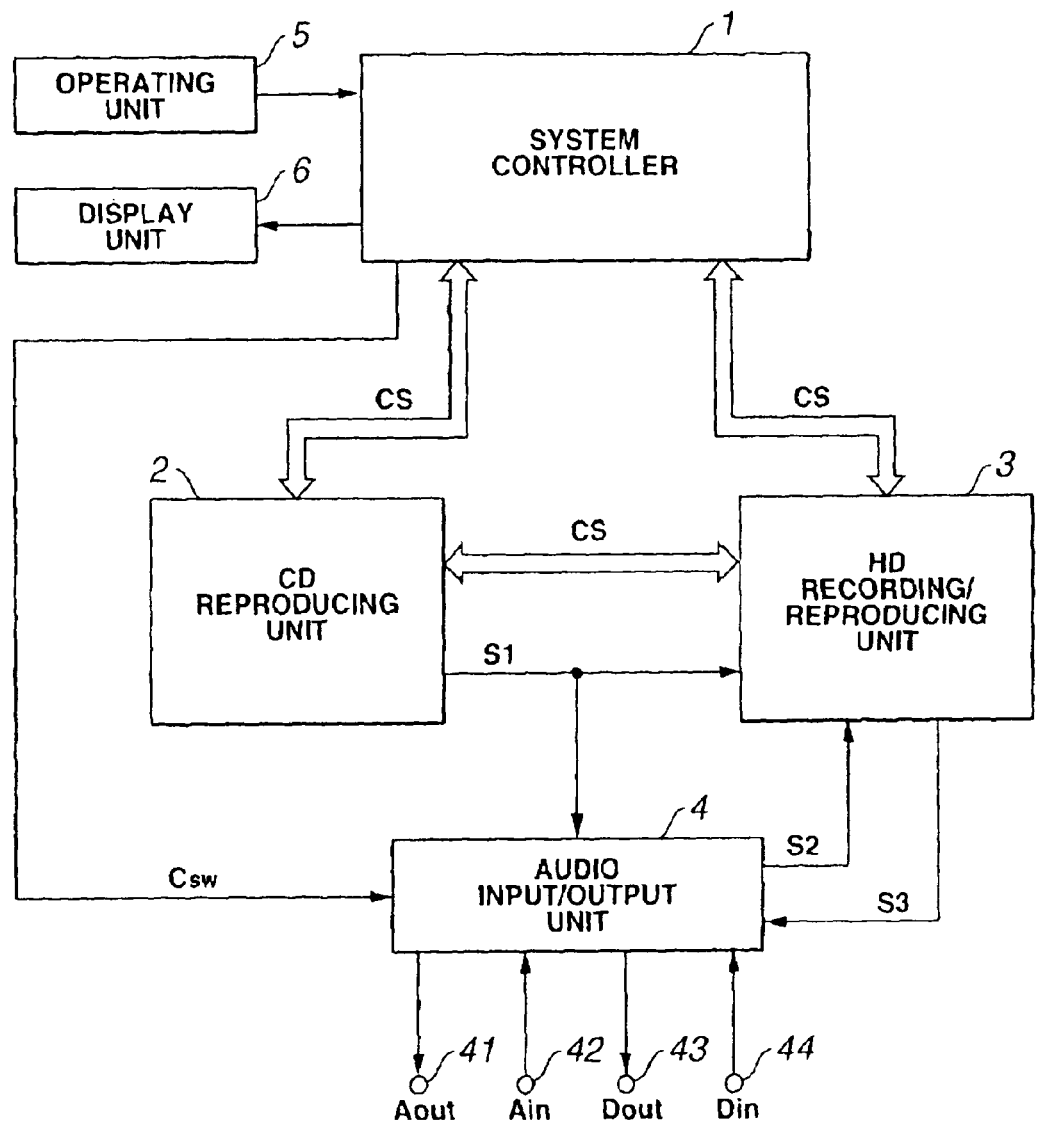
FIG. 1 is a block diagram showing a dubbing device according to the present invention.

(1) Structure of Dubbing Device
(2) Structure of CD Reproducing Unit
(3) Structure of HD Recording/Reproducing Unit
(4) Structure of Audio Input/Output Unit
(5) Subcode and TOC of CD
(6) Database
(7) Processing by System Controller
(8) Processing by CD Controller
(9) Processing by HD Controller
(10) Exemplary Dubbing Operation
(11) Other Examples (1) Structure of Dubbing Device A dubbing device according to the present invention has a system controller 1, a CD reproducing unit 2, an HD recording/reproducing unit 3, an audio input/output unit 4, a operating unit 5, and a display unit 6, as shown in FIG. 1.

The system controller 1, the CD reproducing unit 2 and the HD recording/reproducing unit 3 can communicate various control signals CS to one another. For example, the system controller 1 transmits control signals CS to the CD reproducing unit 2 and the HD recording/reproducing unit 3 and thus causes the CD reproducing unit 2 and the HD recording/reproducing unit 3 to carry out required operations.

The CD reproducing unit 2 and the HD recording/reproducing unit 3 send to the system controller 1 answer signals for the control signals, information such as the operating status, subcode and TOC, which will be described later, and other necessary information.

The system controller 1 is made up of a microcomputer and controls the operation of the whole device by sending the control signals CS. The system controller 1 is provided with an input from the operating unit 5. A power key an ejection key, a reproduction key, a pause key, a stop key, a tune selection key, a recording key and the like are prepared on the operating unit 5 and a user carries out arbitrary operations. In accordance with the operation by the operating unit 5, the system controller 1 instructs the CD reproducing unit 2 and the HD reproducing unit 3 to carry out required operations, by the control signals CS. Moreover, the system controller 1 causes execution of an operation for the user to designate a track number on a CD and instruct reproduction starting with an arbitrary tune, that is, a so-called programmed reproduction for the user to designate the order of reproducing tunes, and an operation called shuffled reproduction to reproduce tunes in a random order.

In order to input additional information, which will be described later, an operator which enables input of characters may be prepared on the system controller 1.

The display unit 6 is connected to the system controller 1, and the system controller 1 supplies display data to the display unit 6 so as to carry out necessary display. On the display unit 6, for example, time information such as the total play time, the lapse of time of a tune which is being played, the remaining play time of a tune which is being reproduced and the remaining play time of the whole CD, and the track number of a tune which is being played are displayed as information related to the CD loaded in the CD reproducing unit 2.

In the case of a disc on which its disc name and track names (tune names) are recorded, the disc name and track names are displayed on the display unit 6.

The CD reproducing unit 2 is a part for loading a CD-DA thereon, which is equivalent to a first recording medium, and reproducing data from the CD-DA. As will be later described in detail, audio data S1 (PCM digital audio data) reproduced from the CD is supplied to the audio input/output unit 4 and the HD recording/reproducing unit 3.

The CD reproducing unit 2 is a part which can reproduce music data from a disc of the CD format. While the CD reproducing unit 2 supports a CD-DA in this description, it can similarly reproduce music data recorded on other types of discs of the CD format such as CD-R and CD-RW. As one type of CD-DA, there is a disc called CD text on which text data is recorded in a subcode. In this case, the text data is reproduced from the subcode along with the reproduction of music data.

Although a CD is used as the first recording medium in this embodiment, the first recording medium may be another type of medium such as an MD, memory card, or DAT (digital audio tape). In such a case, an MD reproducing unit, a memory card reproducing unit, a DAT reproducing unit or the like may be provided instead of or in addition to the CD reproducing unit 2.

The HD recording/reproducing unit 3 is a part having an HDD as a second recording medium with a large capacity and adapted for recording/reproducing data to/from the HDD. The HDD as the second recording medium has a very large capacity of, for example, several tens GB, compared with the CD as the first recording medium.

The structure of the HD recording/reproducing unit 3 will be described later. Audio data S1 from the CD reproducing unit 2 and audio data S2 (PCM digital audio data) from the audio input/output unit 4 are inputted to the HD recording/ reproducing unit 3, and the HD recording/reproducing unit 3 records the audio data S1, S2 to the HDD. The HD recording/ reproducing unit 3 also outputs audio data S3 reproduced from the HDD to the audio input/output unit 4.

The audio input/output unit 4 is a part for inputting/outputting audio data. The audio input/output unit 4 outputs audio data reproduced from the CD reproducing unit 2 and the HD recording/reproducing unit 3 to a speaker system or other equipments and inputs audio data (digital audio data or analog audio signals) supplied from other equipments. The system controller 1 controls the input/output path of the audio input/output unit 4 by a switch control signal CSW. The details will be described later.

(2) Structure of CD Reproducing Unit

Figure 2:
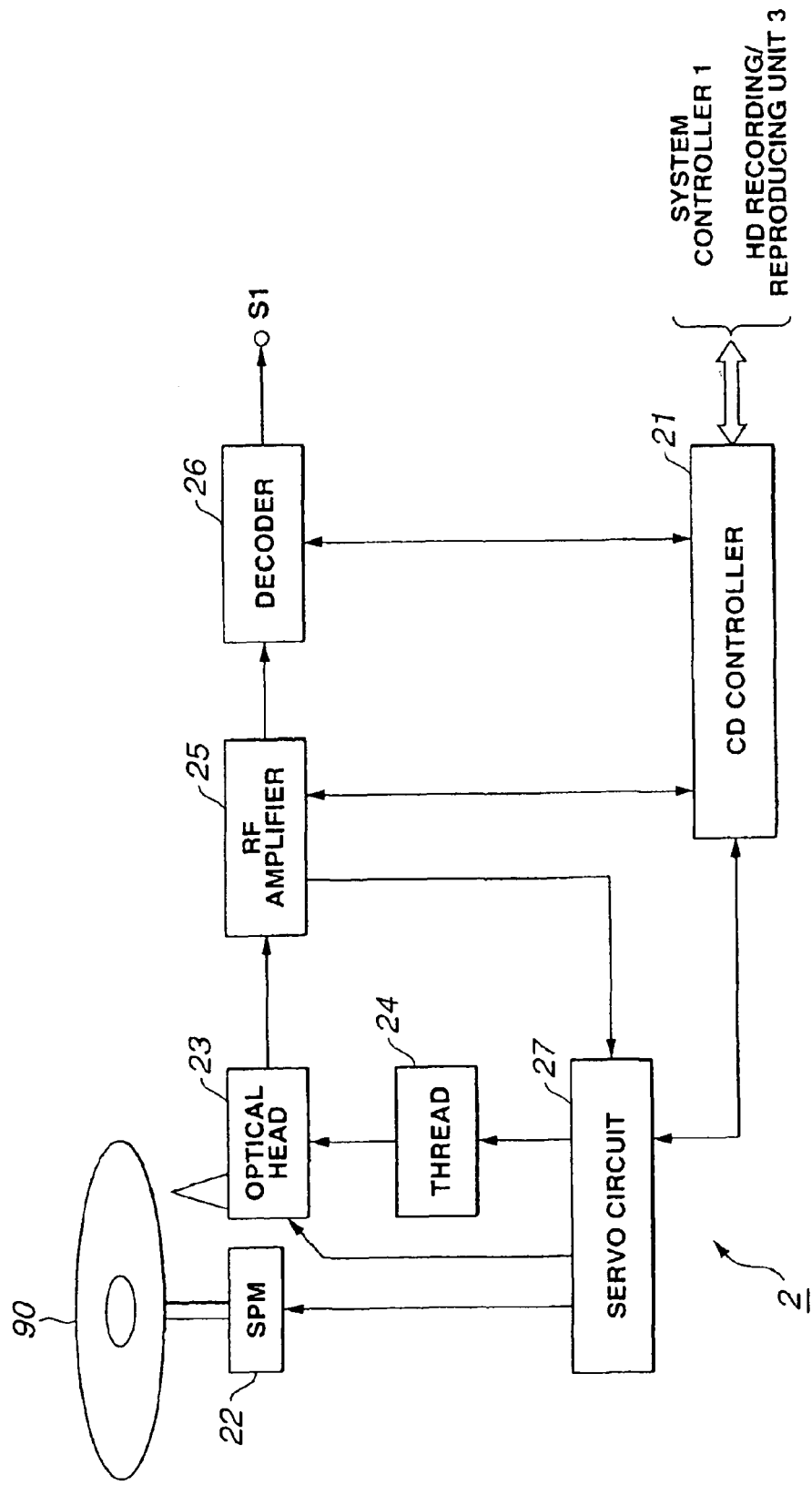
FIG. 2 is a block diagram showing a CD reproducing unit constituting the dubbing device according to the present invention.

The CD reproducing unit 2 has a structure as shown in FIG. 2. A disc 90 is a CD loaded on the CD reproducing unit 2.

In the CD reproducing operation, the disc 90 is rotationally driven at a constant linear velocity (CLV) by a spindle motor 22. Then, data recorded on the disc 90 in the form of pits is read out by an optical head 23 and supplied to an RF amplifier 25.

To read out data from the disc 90, a laser diode as a laser light source, a photodetector for detecting reflected light, an objective lens as an output end of a laser beam, and an optical system for casting the laser beam to a disc recording surface via the objective lens and leading its reflected light to the photodetector are provided in the optical head 23, though not shown.

The objective lens is held to be movable in a tracking direction and a focusing direction by a biaxial driving mechanism.

The optical head 23 as a whole is made movable in a radial direction of the disc by a thread mechanism 24.

The RF amplifier 25 generates a focusing error signal and a tracking error signal in addition to a reproduced RF signal.

These error signals are supplied to a servo circuit 27. The servo circuit 27 generates a focusing driving signal, a tracking driving signal and a thread driving signal from the focusing error signal and the tracking error signal, and controls the operation of the biaxial driving mechanism in the optical head 23 and the thread mechanism 24.

The servo circuit 27 generates the thread driving signal in accordance with a low-frequency component of the tracking error signal and an access designation signal from a CD controller 21 and controls the operation of the thread mechanism 24 to move the optical head 23. The servo circuit 27 generates a spindle driving signal on the basis of a spindle error signal and a spindle kick/brake signal supplied from a decoder 26 or the CD controller 21, and controls the operation of the spindle motor 22.

The reproduced RF signal outputted from the RF amplifier 25 is supplied to the decoder 26. The decoder 26 performs CIRC decoding or the like to decode the information read out from the disc 90 to digital audio data S1 of 16-bit quantization and 44.1-kHz sampling. This digital audio data S1 is supplied to the HD recording/reproducing unit 3 and the audio input/ output unit 4, as shown in FIG. 1.

The decoder 26 also extracts control data such as TOC and a subcode, which are supplied to the CD controller 21 and used for various control. The CD controller 21 is constituted by a microcomputer for controlling the CD reproducing unit 2.

In reproducing the disc 90 (CD), management information recorded on the CD, that is, the TOC, must be read out. The CD controller 21 discriminates the number of tracks recorded on the disc 90 and the address of each track in accordance with the management information and controls the reproducing operation. Therefore, when the disc 90 is loaded, the CD controller 21 reads out the TOC by carrying out the reproducing operation on the innermost side of the disc where the TOC is recorded, then stores the TOC in, for example, an internal RAM, and refers to the TOC in the subsequent reproducing operation of the disc 90.

If the disc 90 is a CD text, text data is recorded in a subcode which forms TOC data. The CD controller 21 reads this text data when reading the TOC and stores the text data into the internal RAM. There is a mode such that the text data is recorded in a subcode of a program area, instead of a so-called TOC area. In such a case, the text data is taken in together with subcode data extracted in accordance with the progress in reproduction of the program (tracks).

The CD controller 21 communicates various control signals CS to/from the system controller 1 and the HD recording/ reproducing unit 3 (HD controller 31 within the HD recording/reproducing unit 3, which will be described later), as shown in FIG. 1.

For example, when an operation such as reproduction of the CD, FF (fast-forward), REW (rewind), AMS (automatic music sensor), pause or stop is carried out by the operating unit 5, the system controller 1 sends such operation information to the CD controller 21. In accordance with the operation information, the CD controller 21 controls each part of the CD reproducing unit 2 so that an operation intended by the user is executed.

The CD controller 21 sends the operating status of the CD reproducing unit 2, the TOC information and text information read from the disc 90, and the time information (address) and the like during the reproduction of the CD, to the system controller 1.

Having received such information transmitted from the CD controller 21, the system controller 1 grasps the operating status of the CD reproducing unit 2 and can cause the display unit 6 to perform various displays as described above on the basis of the TOC and subcode information.

The CD controller 21 sends and receives various information to and from the HD recording/reproducing unit 3 in the dubbing operation, a specific example of which will be described later.

(3) Structure of HD Recording/Reproducing Unit

Figure 3:
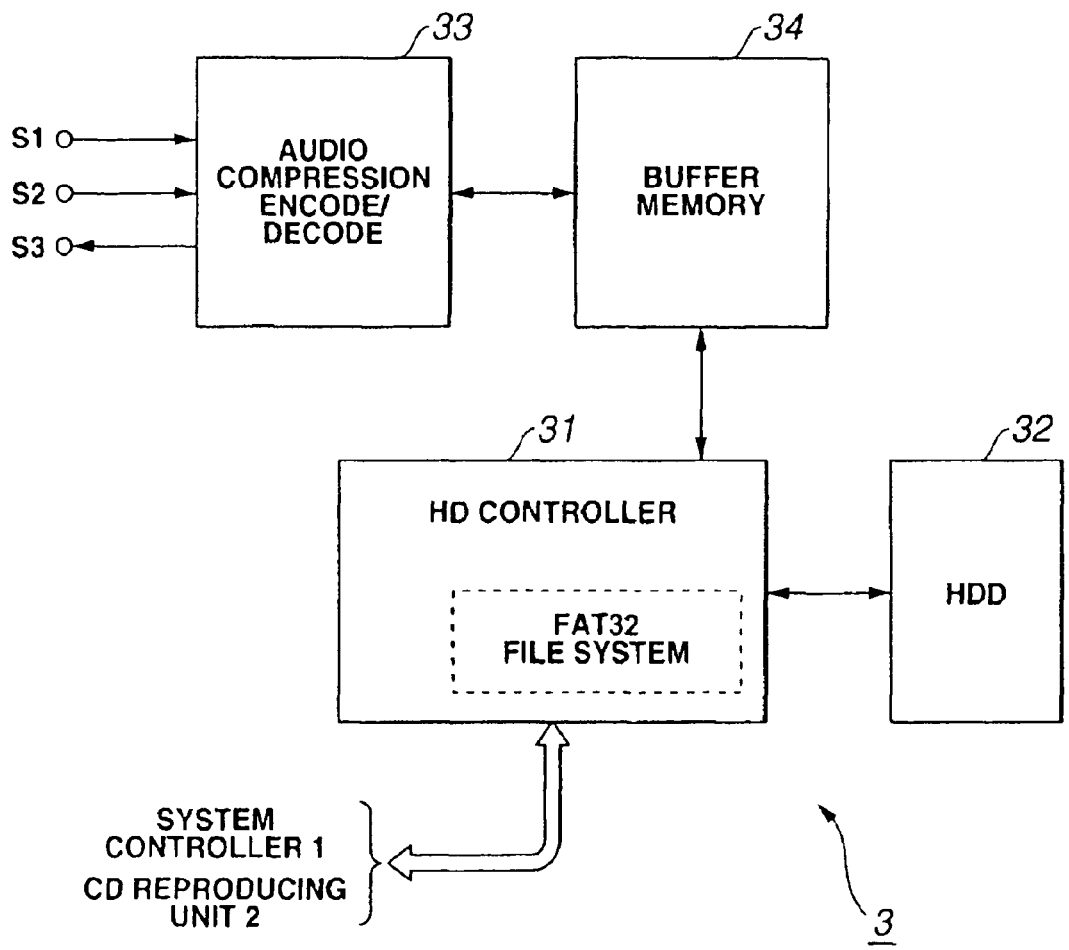
FIG. 3 is a block diagram showing an HD recording/reproducing unit constituting the dubbing device according to the present invention.

The HD recording/reproducing unit 3 is constituted as shown in FIG. 3. The HD recording/reproducing unit 3 has an HDD (hard disk drive) 32 as the second recording medium with a large capacity. An HD controller 31 is a controller for controlling the operation of the HD recording/reproducing unit 3. Inside the HD controller 31, mechanism called file system for realizing access, reading and writing to the HDD 32 is provided. For example, it is a FAT32 file system.

The HD controller 31 communicates various control signals CS to/from the system controller 1 and the CD reproducing unit 2 (CD controller 21), as shown in FIG. 1. For example, in the automatic dubbing operation at the time of reproduction by the CD reproducing unit 2, as will be described later, the system controller 1 gives a dubbing instruction and other instructions to the HD controller 31.

To the CD controller 21, the TOC information and text information read from the disc 90 for reproduction are sent. The TOC information and the like are used for generation of and search for the identification information of the disc in a database, which will be described later.

The HD controller 31 sends the operating status and information related to the dubbing operation to the system controller 1 and the CD controller 21.

Under the control of the HD controller 31, data is written to and read out from the HDD 32. Particularly, the digital audio data S1 reproduced by the CD reproducing unit 2 and the digital audio data S2 supplied from the audio input/output unit 4 are processed in a predetermined manner and then recorded to the HDD 32. The recorded data is managed by the FAT32 file system. The recorded data is reads out by the HD controller 31, supplied to the audio input/output unit 4 and then outputted.

For example, in the case where the user carried out an operation to designate and reproduce a tune or the like recorded on the HDD 32 by using the operating unit 5, the system controller 1 sends the operation information to the HD controller 31. Then, the HD controller 31 causes the data of the designated tune or the like to be reproduced from the HDD 32 and supplies the data to the audio input/output unit 4 as audio data S3.

As will be described later, a database is constructed on the HDD 32 which has data corresponding to each CD in order to determine whether or not the HD controller 31 carries out the automatic dubbing operation in reproduction by the CD reproducing unit 2.

The HD controller 31 can refer to and update the database stored on the HDD 32, when necessary.

An audio compression-encoding/decoding circuit 33 and a buffer memory 34 are parts for processing recorded data and reproduced data on the HDD 32.

The digital audio data S1 from the CD reproducing unit 2 or the digital audio data S2 from the audio input/output unit 4 is inputted to the HD recording/reproducing unit 3. When the digital audio data S1, S2 is inputted, data compression processing is performed by the audio compression-encoding/decoding circuit 33. For example, compression processing of the ATRAC3 system is carried out. The compressed digital audio data is stored into the buffer memory 34 and recorded to the HDD 32 under the control of the HD controller 31.

In reproduction from the HDD 32, data read out from the HDD 32 by the HF controller 31 is stored into the buffer memory 34. The data stored in the buffer memory 34 is read out from the buffer memory 34 at a predetermined rate and data expansion processing is performed thereon by the audio compression-encoding/decoding circuit 33. Thus, the compression processing of the ATRAC3 system is canceled and the resultant data is outputted to the audio input/output unit 4 as the normal digital audio data S3.

The compression system is not limited to ATRAC3 and may be other compression systems such as MPEG audio. Alternatively, the data may be recorded to the HDD 32 without being compressed.

Moreover, the data recorded to the HDD 32 may be encrypted, and in reproduction, the data may be decrypted.

(4) Structure of Audio Input/Output Unit

Figure 4:
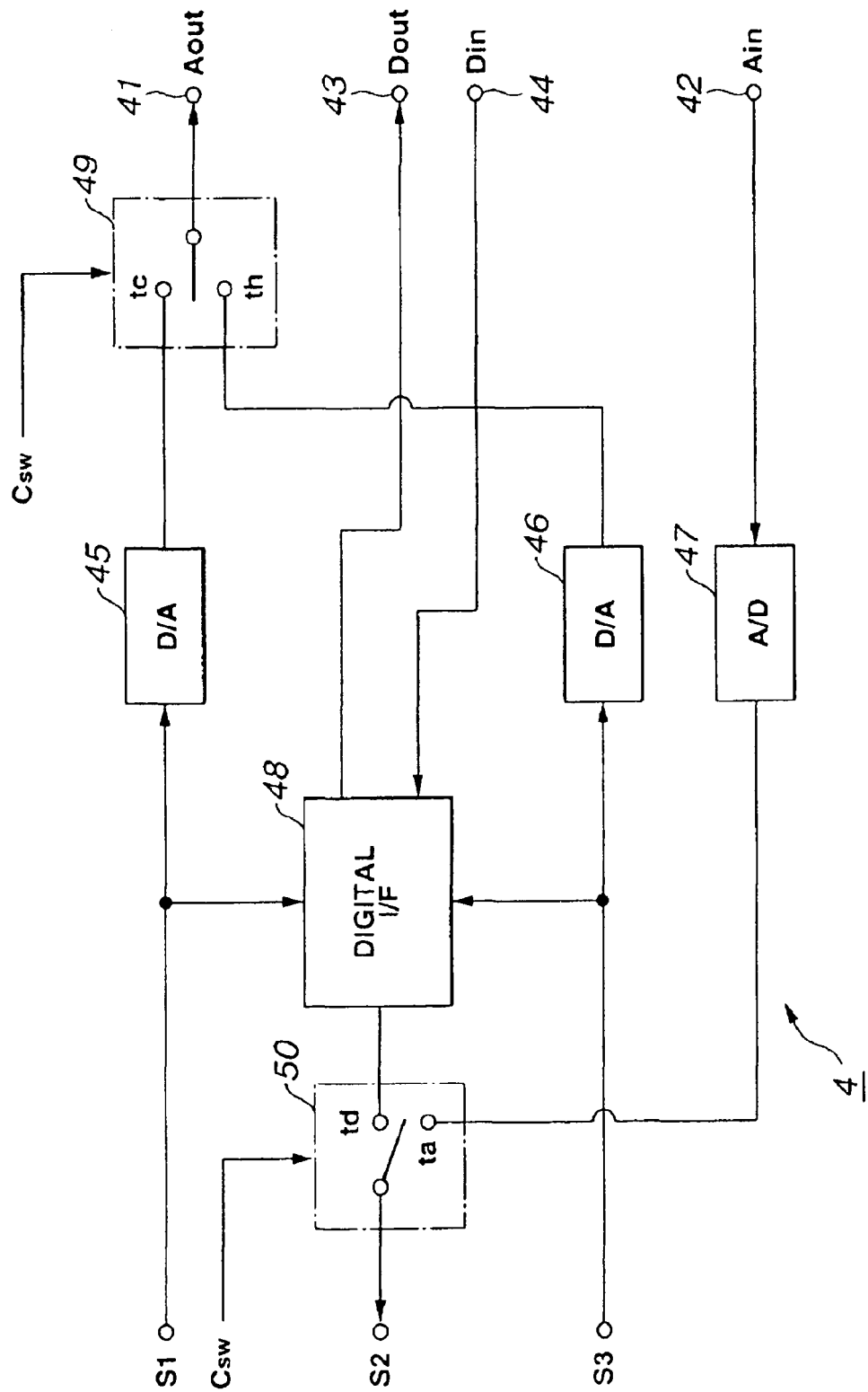
FIG. 4 is a block diagram showing an audio input/output unit constituting the dubbing device according to the present invention.

The audio input/output unit 4 has an analog audio signal output terminal 41, an analog audio signal input terminal 42, a digital audio data output terminal 43, a digital audio data input terminal 44, D/A converters 45, 46, an A/D converter 47, a digital interface 48, and switches 49, 50, as shown in FIG. 4.

The digital audio data S1 reproduced by the CD reproducing unit 2 and the digital audio data S3 reproduced by the HD recording/reproducing unit 3 are supplied to the audio input/output unit 4.

While the reproducing operation is being carried out by the CD reproducing unit 2, the system controller 1 connects the switch 49 to a tc terminal by a switch control signal CSW.

Therefore, the digital audio data S1 from the CD reproducing unit 2 is converted to an analog audio signal by the D/A converter 45, then supplied to the output terminal 41 via the switch 49, and outputted as the analog audio signal.

While the reproducing operation is being carried out by the HD recording/reproducing unit 3, the system controller 1 connects the switch 49 to a th terminal by a switch control signal CSW.

Therefore, the digital audio data S3 from the HD recording/reproducing unit 3 is converted to an analog audio signal by the D/A converter 46, supplied to the output terminal 41 via the switch 49, and outputted as the analog audio signal.

The analog audio signal from the output terminal 41 is amplified by a power amplifier and then outputted from a speaker or supplied to another equipment as a line output.

The digital audio data S1 reproduced by the CD reproducing unit 2 and the digital audio data S3 reproduced by the HD recording/reproducing unit 3 are also supplied to the digital interface 48. The digital interface 48 encodes the digital audio data S1 or S3 supplied thereto to a transmission data form as a digital interface format and outputs the encoded data from the output terminal 43. That is, the reproduced audio data can be transmitted in the digital audio data form to another equipment.

The HD recording/reproducing unit 3 can record to the HDD 32 not only the digital audio data S1 from the CD reproducing unit 2 but also the digital audio data S2 supplied from the audio input/output unit 4. Therefore, the audio input/output unit 4 outputs the digital audio data S2 in the following manner.

First, in the case where an analog audio signal from an external equipment is inputted to the input terminal 42, the analog audio signal is converted by the A/D converter 47 to digital audio data having a sampling frequency of 44.1 kHz and the number of quantization bits of 16. In this case, the system controller 1 connects the switch 50 to a ta terminal by a switch control signal CSW. Therefore, the output of the A/D converter 47 is supplied to the HD recording/reproducing unit 3 as the digital audio data S2.

In the case where digital audio data from an external equipment is inputted to the input terminal 44, the inputted data is decoded by the digital interface 48. In this case, the system controller 1 connects the switch 50 to a td terminal by a switch control signal CSW. Therefore, the output decoded by the digital interface is supplied to the HD recording/reproducing unit 3 as the digital audio data S2.

Moreover, the digital audio data S2 reproduced by the CD reproducing unit 2 can be supplied to the HD recording/reproducing unit 3 as the digital audio data S2 via the digital interface 48.

(5) Subcode and TOC of CD

A subcode recorded together with main data on a disc of the CD format, and TOC recorded in a lead-in area will now be described.

The minimum unit of data recorded on a disc of the CD format is one frame. 98 frames constitute one block.

Figure 5:
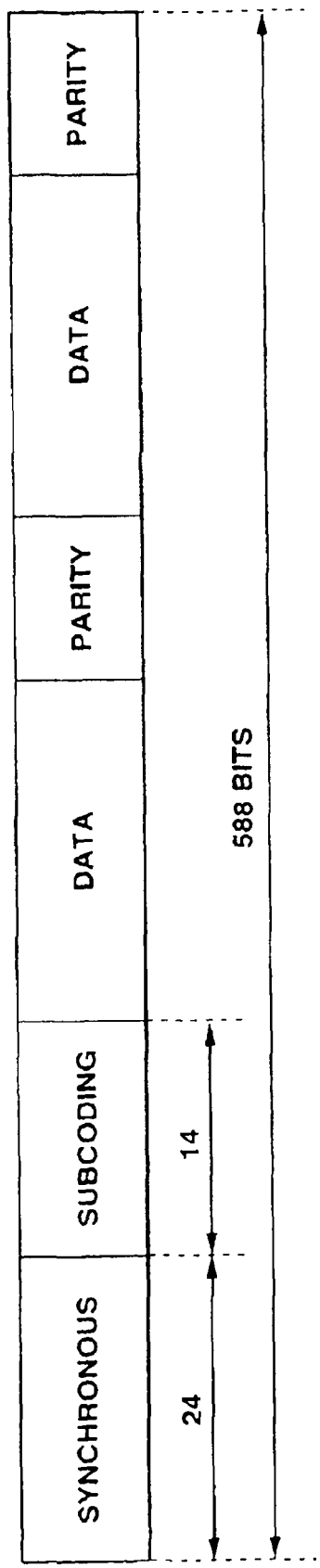
FIG. 5 is an explanatory view showing a frame structure of the CD format.

One frame has a structure as shown in FIG. 5.

One frame is made up of 588 bits. The leading 24 bits constitute synchronous data and the subsequent 14 bits constitute a subcode area, followed by data and parities.

98 frames, each having this structure, constitute one block, and subcode data taken out from the 98 frames are collected to form subcode data (subcoding frame) of the one block, as shown in FIG. 6A. The subcode data from the leading first and second frames (frame 98n+1, frame 98n+2) of the 98 frames are synchronous patterns. The frames from the third frame to the 98$^{th}$ frame (frame 98n+3 to frame 98n+98) constitute channel data of 96 bits each, that is, subcode data of P, Q, R, S, T, U and V. Of these, the P-channel and the Q-channel are used for management of access and the like. However, the P-channel only indicates a pause portion between tracks and detailed control is performed by the Q-channel (Q1 to Q96). The Q-channel data of 96 bits is constituted as shown in FIG. 6B. First, the four bits of Q1 to Q4 form control data, which is used for the number of audio channels, emphasis, CD-ROM, and the identification as to whether digital copying is possible or not. The next four bits of Q5 to Q8 form ADR, which indicates the mode of sub-Q data. Specifically, the four bits of ADR express the mode (content of sub-Q data) as follows.

| | |
|---|---|
| 0000: mode 0 | Sub-Q data is basically all-zero (though it is used in CD-RW) |
| 0001: mode 1 | Normal mode |
| 0010: mode 2 | Indicates the catalog number of the disc |
| 0011: mode 3 | Indicates ISRC(International Standard Recording Code) or the like |
| 0100: mode 4 | Used in CD-V |
| 0101: mode 5 | Used in a multi-session system such as CD-R, CD-RW or CD-EXTRA |

The 72 bits of Q9 to Q80 following the ADR form sub-Q data, and the remaining bits of Q81 to Q96 form CRC.

The address is expressed by the sub-Q data in the case where the mode 1 is indicated by the ADR.

The sub-Q data and the TOC structure in the case of ADR=mode 1 will be described with reference to FIG. 7A, FIG. 7B and FIG. 8

The sub-Q data recorded in the lead-in area of the disc forms TOC information. That is, the sub-Q data of 72 bits Q9 to Q80 in the Q-channel data read from the lead-in area has information as shown in FIG. 7A. This FIG. 7A shows the details of the 72-bit sub-Q data portion in the structure of FIG. 6B in the lead-in area. The sub-Q data has data of eight bits each and expresses the TOC information.

First, the track number (TNO) is recorded in the eight bits of Q9 to Q16. In the lead-in area, the track number is fixed to "00". Subsequently, POINT (point) is described in the eight bits of Q17 to Q24.

Eight-bit sets of Q25 to Q32, Q33 to Q40, and Q41 to Q48 express MIN (minute), SEC (second), and FRAME (frame), respectively, as the lapse of time in the lead-in area.

Q49 to Q56 are set to "00000000".

Moreover, eight-bit sets of Q57 to Q64, Q65 to Q72, and Q73 to Q80 record PMIN, PSEC, and PFRAME, respectively. The meanings of these PMIN, PSEC and PFRAME are determined depending on the value of POINT.

When POINT has values of "01" to "99", the value of POINT indicates the track number. In PMIN, PSEC and PFRAME in this case, the start point (absolute time address) of the track having this track number is recorded as minute (PMIN), second (PSEC) and frame (PFRAME), respectively.

When POINT has a value of "A0", the track number of the first track is recorded in PMIN. The specifications of CD-DA (digital audio), CD-I, CD-ROM (XA-specific) and the like are discriminated depending on the value of PSEC.

When POINT has a value of "A1", the track number of the last track is recorded in PMIN.

When POINT has a value of "A2", the start point of the lead-out area is expressed as the absolute time address (minute (PMIN), second (PSEC) and frame (PFRAME) in PMIN, PSEC and PFRAME, respectively.

For example, for a disc on which six tracks (six programs or six tunes) are recorded, data is recorded as shown in FIG. 8 as the TOC formed by such sub-Q data.

To form the TOC, all the track numbers TNO are "00", as shown in FIG. 8.

Block NO. Indicates the number of one unit of sub-Q data read as block data (subcoding frame) made up of 98 frames as described above.

The same content is written over three blocks each, as the respective TOC data.

As shown in FIG. 8, when POINT has values of "01" to "06", the start points of the first track #1 to the sixth track #6 are expressed in PMIN, PSEC and PFRAME.

When POINT has a value of "A038", "01" is expressed in PMIN as the first track number. The disc is identified in accordance with the value of PSEC, which is "00" in the case of an ordinary audio CD. If the disc is CD-ROM (XA-specific), PSEC has a value of "20".

When POINT has a value of "A1", the track number of the last track is recorded in PMIN. When POINT has a value of "A2", the start point of the lead-out area is expressed in PMIN, PSEC and PFRAME.

With respect to the block n+27 and the subsequent blocks, the contents of the blocks n to n+26 are repeatedly recorded.

In the program area and the lead-out area where tunes are recorded as the track #1 to the track #n, the sub-Q data recorded therein has information as shown in FIG. 7B. FIG. 7B shows the details of the 72-bit sub-Q data portion in the structure of FIG. 6B in the program area and the lead-out area.

In this case, first, the track number (TNO) is recorded in the eight bits of Q9 to Q16. That is one of "01" to "99" is used as each of the tracks #1 to #n. In the lead-out area, the track number is "AA". Then, an index is recorded in the eight bits of Q17 to Q24. The index is the information which enables subdivision of each track.

Eight-bit sets of Q25 to Q32, Q33 to Q40, and Q41 to Q48 express MIN (minute), SEC (second), and FRAME (frame), respectively, as the lapse of time (relative address) in the track.

Q49 to Q56 are set to "00000000".

Eight-bit sets of Q57 to Q64, Q65 to Q72, and Q73 to Q80 record AMIN, ASEC, and AFRAME, respectively. These are the minute (AMIN), second (ASEC) and frame (AFRAME) as the absolute address.

The absolute address is an address continuously appended from the leading end of the first track (i.e., the leading end of the program area) to the lead-out area.

The subcode and the TOC formed by the subcode are basically constituted as described above. The subcode may further include various information.

For example, in the case of a CD text, text information is stored by using R to W of the above-described subcode data of P, Q, S, T, U, V and W.

(6) Database

The database used in the automatic dubbing operation of the present invention will now be described.

In the present invention, as data is reproduced from the disc 90 by the CD reproducing unit 2, the reproduced data is automatically dubbed to the HDD 32 by the HD recording/reproducing unit 3.

However, the operation to constantly dub reproduced data is often unnecessary. For example, it is not preferred that the same data is dubbed again when the user reproduces the same CD or the same tune many times.

Thus, in the present invention, a database is constructed in the HDD 32 in order discriminate whether or not dubbing has already been carried out with respect to the disc 90 from which data is to be reproduced by the CD reproducing unit 2.

This database can identify respective CDs having various titles and can also perform management with respect to whether each track recorded on each CD has already been dubbed or not.

That is, data of one file constituting the database corresponds to one CD and the file contains as least identification information of the CD and recording history information indicating whether each track recorded on the CD has already been dubbed or not.

FIG. 9 shows an exemplary file constituting the database, that is, a database file formed to correspond to a certain CD.

In this database file, identification information DID indicating a specific CD and a recording flag indicating whether or not each track has already been dubbed are recorded. Moreover, track additional information added to each track and disc additional information added to each disc are stored.

The identification information DID is generated on the basis of the TOC data of the disc 90 (CD). For example, it is now assumed that the CD having six tracks shown in FIG. 8 is loaded in the CD reproducing unit 2. In this case, the CD reproducing unit 2 first reads out the TOC data of the disc 90 and the TOC data is also transmitted to the HD controller 31. The HD controller 31 forms the identification information shown in FIG. 9 by using the TOC data transmitted thereto. The identification information DID shown in FIG. 9 uses the track number of each recorded track and the value of the address of its start point (PMIN, PSEC, PFRAME), as can be seen from the comparison with FIG. 8.

All the values of the TOC data, in which the number of tracks contained in the CD and the absolute time (start point) to start a track are written in the form of minute, second and frame, can hardly be the same in different CDs. Therefore, these TOC data can be the identification information of CDs having specific titles. In this example, this characteristic is utilized to generate the identification information DID of each file in the database.

As in the database file shown in FIG. 9, a recording flag corresponding to each track is provided. At the time of generating the database file, all the recording flags are off (=0). For each track, the recording flag is turned on (=1) every time dubbing to the HDD 32 is completed.

In the example of FIG. 9, it is shown that the tracks 2, 3 and 6 have already been dubbed to the HDD 32.

As will be described later, the recording flag is turned on (=1) when the track (tune or the like) could be completely dubbed to the HDD 32. For example, if the tune could be dubbed only halfway, or if fast-forward was made on the reproducing side at a halfway point of the tune and hence the original reproduced data could not be dubbed, the recording flag is not turned on. That is, it is then considered that the tune has not been dubbed.

When there is additional information for a certain CD, or when additional information is inputted by the user or received and inputted by some communication means, the additional information is stored into the database file.

The additional information is, for example, text data, image data, management data and the like. The text data includes the name of the tune, the name of the artist, the lyrics, the names of parties concerned such as the name of the songwriter/composer, the name of the production company and the like. The image data includes an image of the album cover, an image of the artist, an impression image and the like. The management data may include, for example, copyright management information such as ISRC and the like.

For example, the disc 90 from which data is to be reproduced is a CD text, the text data read out from the subcode can be stored into the database file in association with the track or disc.

Of course, when the user arbitrarily inputs the name of the tune or the like, it can be stored as additional information.

The additional information can also be used as the identification information DID.

When a certain CD is reproduced for the first time by the CD reproducing unit 2, such a database file is generated corresponding to the CD and is registered to the database.

When a CD for which the database file has already been generated is reproduced by the CD reproducing unit 2, the HD controller 31 generates the identification information DID from the TOC data transferred thereto from the CD reproducing unit 2 and searches the database on the basis of the identification information DID and thus can confirm the existence of the database file corresponding to the CD. In such a case, it is discriminated from the recording flag whether each track of the CD has already been recorded or not.

(7) Processing by System Controller

The operation related to the automatic dubbing operation in the dubbing device according to the present invention will now be described.

In the following description, the processing by the system controller 1, the processing by the CD controller 21 and the processing by the HD controller 31 with respect to the dubbing operation will be first described with reference to FIGS. 10 to 15. After that, the flow of specific operations will be described as exemplary operations with reference to FIGS. 16 to 19.

First, the processing by the system controller 1 will be described with reference to FIG. 10.

At step F101, the system controller 1 monitors execution of an operation at the operating unit for a user to designate reproduction of a CD.

When the operation to designate reproduction is carried out, the system controller 1 at step F102 sends operation information of the user to the CD reproducing unit 2 (CD controller 21) and gives an instruction to transfer TOC information of the disc 90 currently loaded in the CD reproducing unit 2 to the HD controller 31.

If the user simply carried out the operation to designate reproduction of the CD, the operation information is the reproducing operation information. In that case, the CD reproducing unit 2 starts reproduction at the first track of the disc 90. However, if the user carried out the reproducing operation with a designated track number, also the track number is sent as the reproducing operation information. In that case, the CD reproducing unit 2 starts reproducing the track of the designated track number.

If the user carried out a so-called programmed reproduction operation to designate the order of tunes, also the information of the designated order of tunes is sent as the reproducing operation information.

If the user designated so-called shuffled reproduction to reproduce in a random order, information to the effect that it is the shuffled reproduction operation is sent as the reproducing operation information.

As will be described later, as the system controller 1 at step F102 instructs the CD controller 21 to transfer the TOC information to the HD controller 31, the CD controller 21 transfers the TOC information and the HD controller 31 carries out database search and setting of recording mode on the basis of the TOC information transferred thereto. The HD controller 31 sends the result as a response to the system controller 1.

The system controller 1 at step F103 waits for the response from the HD controller 31, and on receiving the response, the system controller 1 at step F104 discriminates whether or not an all-track recording mode is set in the HD controller 31.

The recording modes set in the HD controller 31 include the all-track recording mode, a partial track recording mode, and a non-recording mode.

The all-track recording mode is a mode in which automatic dubbing is carried out for all the tracks of a CD to be reproduced.

The partial track recording mode is a mode in which automatic dubbing is carried out for a part of the tracks of a CD to be reproduced.

The non-recording mode is a mode in which dubbing is not carried out because dubbing has already been carried out for all the tracks of a CD to be reproduced.

As will be described later, the HD controller 31 sets one of these modes on the basis of the result of the database search.

If all-track recording mode is set in the HD controller 31, the system controller 1 at step F105 instructs the HD controller 31 to start recording, and at step F106, instructs the CD controller 21 to start reproduction. The CD controller 21 is also notified of the mode information set in the HD controller 31.

On the other hand, if the partial track recording mode or the non-recording mode is set in the HD controller 31, the processing of step F105 is not carried out and the system controller 1 at step F106 instructs the CD controller 21 to start reproduction and notifies the CD controller 21 of the recording mode.

The CD reproducing unit 2 starts the reproducing operation of the disc 90 in response to the reproduction start instruction of step F106. During this time, the system controller 1 monitors the user operation and the reproducing status by using a loop of steps F107, F108 and F109.

If the user carried out an operation such as FF, REW, AMS or PAUSE using the operating unit 5, the system controller 1 goes from step F109 to step F110 and notifies the CD controller 21 and the HD controller 31 of the operation information.

The CD controller 21 executes a required operation such as fast-forward, rewind, automatic music sensor, or pause in response to the operation information of FF, REW, AMS or PAUSE. In this specification, the status different from normal continuous reproduction, such as fast-forward, rewind, automatic music sensor or pause, is referred to as special reproducing status.

The system controller 1 notifies the HD controller 31 of such information because the dubbing operation must be interrupted when the special reproducing status is set in the CD reproducing unit 2.

If the user carried out a stop operation using the operating unit 5, the system controller 1 goes from step F108 to step F111 and notifies the CD controller 21 of the operation information. Then, the series of processing ends. In this case, the CD controller 21 ends the reproduction of the disc 90 in response to the notification of the stop operation.

If the reproduction of the disc 90 is completed to the end by the CD reproducing unit 2, the CD controller 21 sends a notification of CD reproduction to the system controller 1. When the notification is sent, the system controller 1 detects the notification at step F107 and ends the processing.

(8) Processing by CD Controller

The processing by the CD controller 21 will now be described with reference to FIGS. 11 and 12.

Figure 10:
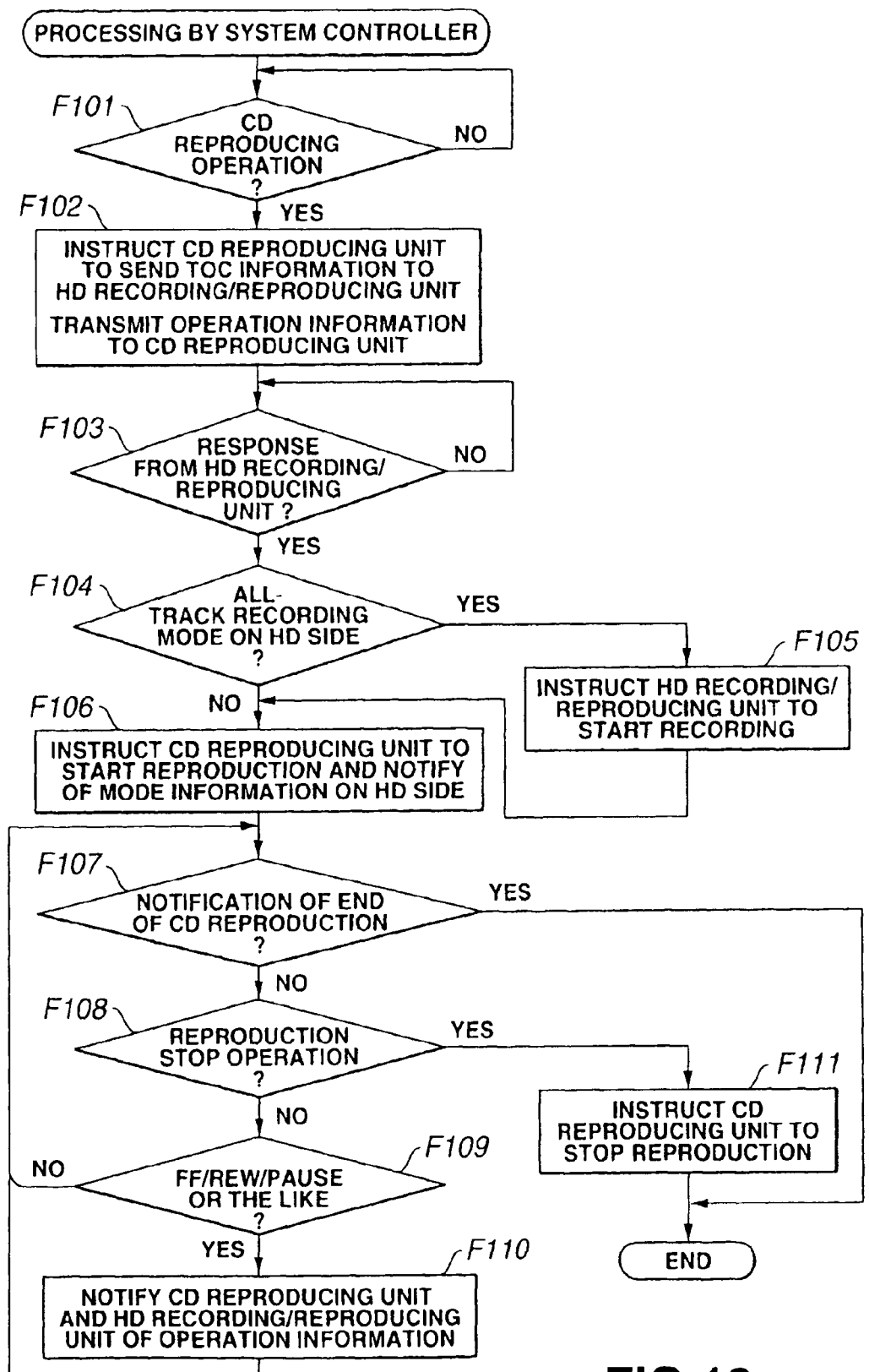
FIG. 10 is a flowchart showing the processing by a system controller.
Figure 11:
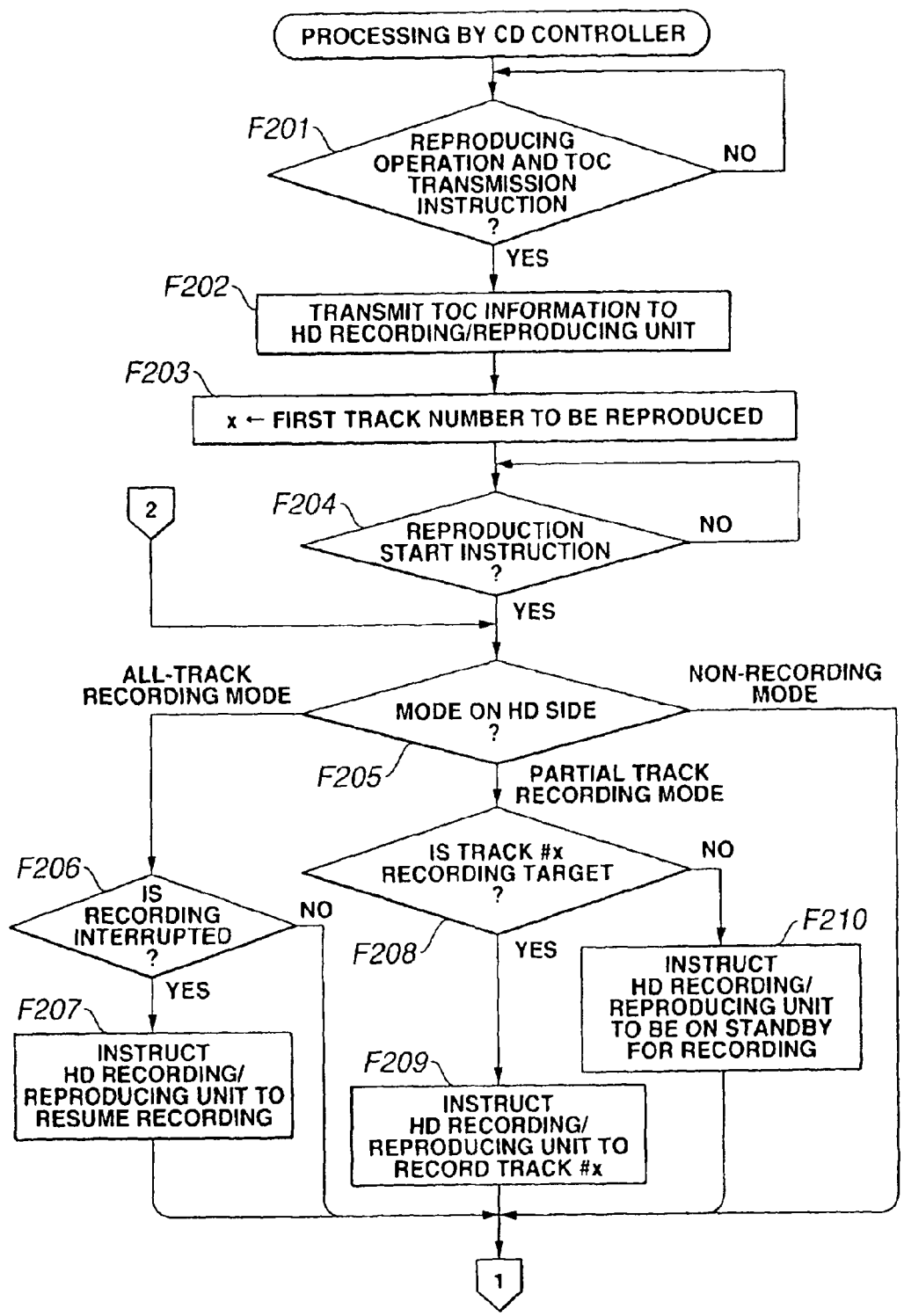
FIG. 11 is a flowchart showing the processing by a CD controller.

At step F201 of FIG. 11, the CD controller 21 waits for a reproduction instruction from the system controller 1. That is, The CD controller 21 waits for the reproducing operation information and the TOC data transfer instruction send by the system controller 1 at step F102 of FIG. 10.

As the instruction is detected at step F201, the CD controller 21 at step F202 transfers the TOC data read with respect to the currently loaded disc 90 to the HD controller 31 in accordance with the instruction from the system controller 1.

At step F203, the CD controller 21 sets a variable x to be the track number of the first track to be reproduced. For example, if the user carried out the normal reproducing operation, the variable x is 1. If the user carried out the reproducing operation with a designated track number, the variable x is set to be the track number designated by the user.

If the user carried out the programmed reproduction operation (reproduction with a designated order of tunes), the variable x is set to be a track number designated by the user as the first tune.

If the user carried out the shuffled reproduction operation, the CD controller 21 selects a random track number and sets the variable x to be this track number.

At step F204, the CD controller 21 waits for a reproduction start instruction from the system controller 1.

At step F106 shown in FIG. 10, the system controller 1 sends the reproduction start instruction and the notification of the recording mode to the CD controller 21. As these are detected at step F204, the CD controller 21 goes to step F205 and branches the processing in accordance with the recording mode of the HD controller 31 which is notified of.

If the non-recording mode is set in the HD controller 31, the processing goes directly to step F211.

If the all-track recording mode is set in the HD controller 31, the processing goes to step F206. However, since the recording at the HD recording/reproducing unit 3 is not being interrupted at the start of reproduction, the processing goes directly to step F211.

If the partial track recording mode is set in the HD controller 31, at the time of starting reproduction of each track, the processing to set whether or not the track is to be dubbed to the HDD 32 is performed at steps F208, F209 and F210.

If the partial track recording mode is set, the HD controller 31 also notifies the system controller 1 of the track number of a track to be dubbed when notifying the system controller 1 of the mode. The track number is also included in the notification of the mode (information received together with the reproduction start instruction at step F204) from the system controller 1 to the CD controller 21. In short, the CD controller 21 grasps the track number of the track to be dubbed by the HD recording/reproducing unit 3.

Thus, at step F208, whether or not a track #x to be reproduced is a track as a dubbing target is determined. If the track #x is a dubbing target, CD controller 21 at step F209 gives a recording start instruction for the track #x to the HD controller 31 and then goes to step F211. On the other hand, if the track #x to be reproduced is not a dubbing target, the CD controller 21 at step F210 gives a recording standby instruction to the HD controller 31 and then goes to step F211.

As the processing goes to step F211, the CD controller 21 starts reproducing the track #x. If the user carried out the normal reproducing operation, the reproduction is started at a track #1 at this point. If the user carried out the reproducing operation with a designated track number, the reproduction is started at the track of the track number designated by the user. In the case of the programmed reproduction or shuffled reproduction, too, the reproduction is started at the first track to be reproduced.

After starting the reproduction of the track #x, the CD controller 21 monitors the reproduction progress status and the user operation by using a loop of steps F212, F213 and F214.

At step F212, the CD controller 21 monitors the completion of the reproduction of the track #x. At step F213, the CD controller 21 monitors the execution of a stop operation by the user. At step F214, the CD controller 21 monitors the execution of an operation to designate a shift to special reproduction such as FF, REW or the like by the user.

As the reproduction of the track #x progresses and the reproduction of the track #x is completed, that is, for example, when the reproduction of the first tune ends, the CD controller 21 at step F212 detects the completion of the reproduction of the track #x and then goes to step F215.

In this case of going from step F212 to step F215, one tune as the track #x has been reproduced from the beginning to the end in the normal reproducing status. In that case, a notification of completion of reproduction for the track #x is outputted to the HD controller 31. The notification of completion of reproduction is information indicating to the HD controller 31 that the track #x has been reproduced from the beginning to the end normally (without being in the special reproducing status).

Next, at step F216, whether all the tracks to be reproduced has been completed or not with respect to the currently reproduced disc 90 is determined.

If the user carried out the normal reproducing operation and CD reproduction was carried out, it is assumed that the CD reproduction is completed when the reproduction of the last track recorded on the disc 90 is completed. If the user carried out the reproducing operation with a designated track number, it is assumed that the CD reproduction is completed when the reproduction started at the track of the track number designated by the user reaches the completion of the reproduction of the last track. If the user designated the programmed reproduction, it is assumed that the CD reproduction is completed when the reproduction of the all the tracks designated in the order is completed. In the case of the shuffled reproduction, it is assumed that the CD reproduction is completed when the reproduction of all the recorded tracks is completed.

If the CD reproduction is not completed yet, the CD controller 21 goes to step F217 and substitutes the track number of the next track to be reproduced for the variable x. If the user carried out the normal reproducing operation or the reproducing operation with a designated track number, a value obtained by adding 1 to the variable x up to then, that is, the next track number, is used. In the case of the programmed reproduction, the track number of the next track to be reproduced corresponding to the tune order designated by the user is substituted for the variable x. In the case of the shuffled reproduction, a track number is randomly selected from the track numbers of the tracks which have not been reproduced and the selected track number is substituted for the variable x.

Then, the processing returns to step F205 of FIG. 11.

Similarly, at step F205, the processing is carried out in accordance with the recording mode of the HD controller 31. Particularly in the case of the partial track recording mode, whether or not a track #x to be reproduced from now is a recording target is determined by the processing of steps F208, F209 and F210. If the track #x is a recording target, the CD controller 21 instructs the HD controller 31 to record the track. If the track #x is not a recording target, the CD controller 21 instructs the HD controller 31 to be on standby for recording.

If the all-track recording mode is set in the HD controller 31, the CD controller 21 at step F206 determines whether the HD recording/reproducing unit 3 is on standby for recording or not. If it is on standby, the CD controller 21 at step F207 gives a recording resumption instruction to the HD controller 31.

The processing goes to step F211 and the reproduction shifts to the track #x, that is, the next track. For convenience, the processing at step F211 is described here as to "start reproducing the track #x". Actually, however, in the case of reproducing in the order of the track numbers, or when shifting to the reproduction of the next track on completion of the reproduction of a certain track, the processing to temporarily stop and then resume the reproduction is not necessary. In short, the reproducing operation itself may be continuously carried out. However, in the case of the programmed reproduction or shuffled reproduction, when reproducing the next track, it is often necessary to interrupt the reproduction and carry out an access operation of the optical head 23.

If the user carried out an operation to designate the special reproduction such as FF by using the operating unit 5 during the reproduction of the track #x, the operation information to that effect is sent from the system controller 1 to the CD controller 21 at step F110 of FIG. 10. If the notification of the operation is sent, the processing by the CD controller 21 shifts from step F214 to step F218 and executes the designated operation. That is, fast-forward reproduction in the case of the FF operation, rewind reproduction in the case of the REW operation, pause in the case of the PAUSE operation, or access to the leading position of the previous or next track in the case of the AMS operation, is carried out in the CD reproducing unit 2.

When the designated special reproducing status ends, the processing shifts to a loop of steps F219, F220 and F221, and the CD controller 21 resumes the normal reproduction (F220) and monitors whether the reproduction shifted to the leading end of the track or not (F219) and whether a reproduction stop instruction is given or the completion of CD reproduction is reached (F212).

For example, if fast-forward or rewind is carried out in accordance with the FF or REW operation, the normal reproduction is restored when the foregoing operation ends. If the leading end of the current track or another track is reached in the state where the normal reproduction is restored, the processing goes from step F219 to step F217 and the track number of a track to be reproduced from that point is substituted for the variable x. Then, the processing returns to step F205 and the above-described processing is carried out to again set the reproducing status for the track #x from step F211. Then, the processing shifts to the loop of steps F212, F213 and F214.

If the completion of CD reproduction is reached at step F221 or the stop operation by the user is notified of from the system controller 1 when the normal reproduction is restored from the fast-forward or rewind operation, the processing goes from step F221 to step F222.

If the pause operation is carried out, a reproduction pause status is set in the CD reproducing unit 2 at step F218. As the user carries out an operation to cancel the pause, the processing shifts to the loop of steps F219, F220 and F221 and the normal reproduction is resumed.

After that, the processing is carried out in accordance with the result of step F219 or F221 similarly to the case of fast-forward.

If the automatic music sensor operation is carried out by the AMS operation, the leading position of the track is accessed at step F218. Therefore, it is determined at step F219 that the reproduction shifted to the leading end of the track when the access ends. The processing then goes to step F217 and the track number of the track for which the automatic music sensor operation was carried out is substituted for the variable x. The processing then returns to step F205 and the above-described processing is carried out to again set the reproducing status for the track #x from step F211. Then, the processing shifts to the loop of steps F212, F213 and F214.

At step F110 of FIG. 10, as described above, the system controller 1 also gives the HD controller 31 a notification to the effect that the operation to designate the special reproduction was carried out. As will be described later, when it is determined that the special reproduction is to be carried out by the CD reproducing unit 2, the HD controller 31 interrupts the recording operation which is being executed.

At the CD controller 21, in the case where the processing returns to step F205 after controlling the special reproduction, if the all-track recording mode is set in the HD controller 31, it will be determined at step F206 that the recording is being interrupted. Thus, at step F207, the CD controller 21 instructs the HD controller 31 to resume recording and carries out reproduction of the track #x from step F211.

If the partial track recording mode is set in the HD controller 31, even in the case where the processing returns to step F205 after the special reproduction, the processing of steps F208, F209 and F210 is similar to the above-described processing.

If a notification of the stop operation by the user is given by the system controller 1 during the reproduction of the track #x, the processing goes from step F213 to step F222.

If it is determined at step F216 that the CD reproduction is completed, again, the processing goes to step F222.

Moreover, if, after the normal reproducing status is restored from the special reproducing status, a notification of the stop operation by the user is given from the system controller 1 or it is determined that the CD reproduction is completed, the processing goes from step F221 to step F222.

When step F222 is thus reached, the CD controller 21 performs control to end the reproducing operation by the CD reproducing unit 2, and at step F223, sends a notification of the end of CD reproduction to the system controller 1 and the HD controller 31. That is, each unit is notified of the end of the reproduction by the CD reproducing unit 2. Then, the series of processing ends.

(9) Processing by HD Controller

The processing by the HD controller 31 will now be described with reference to FIGS. 13, 14 and 15.

Figure 13:
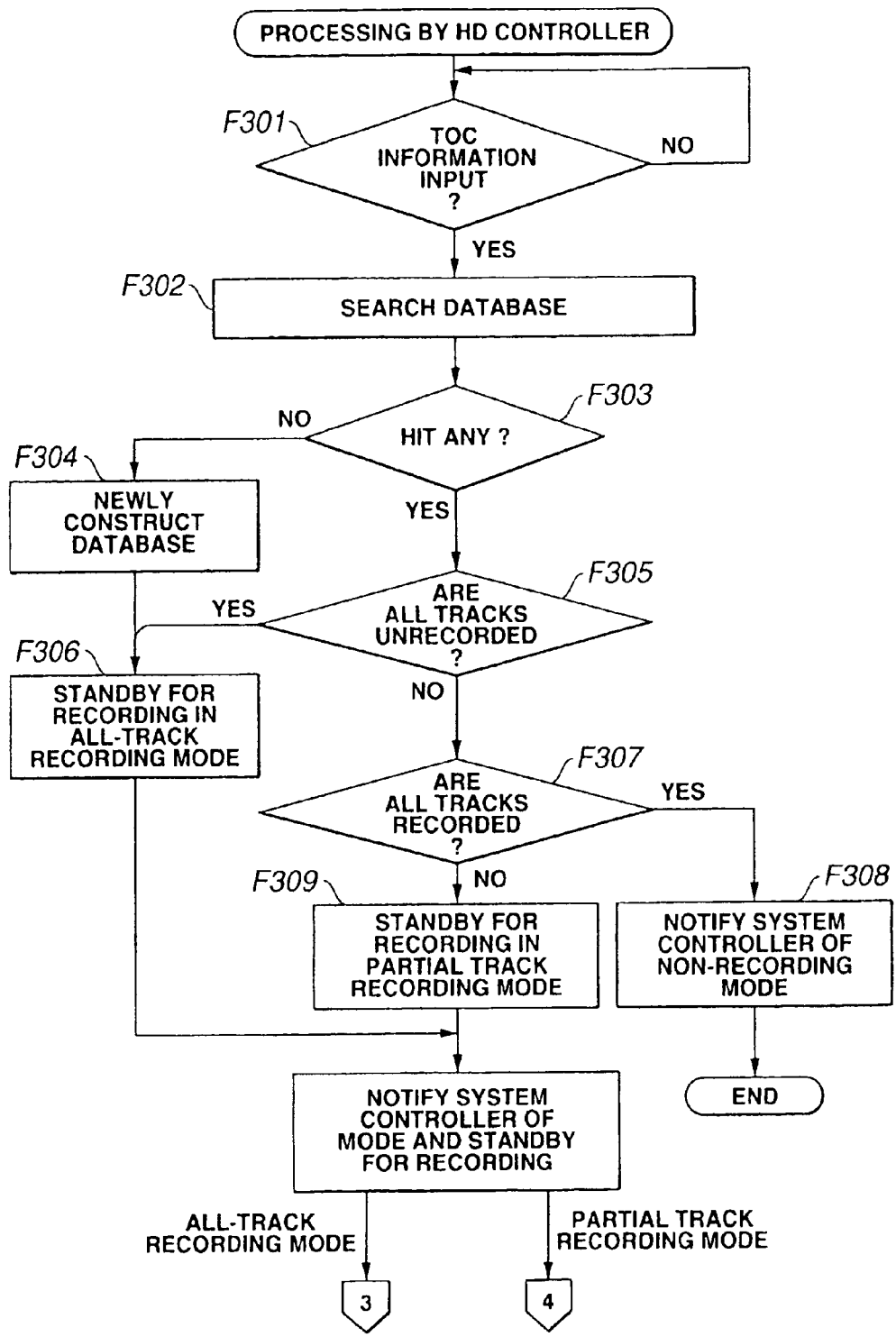
FIG. 13 is a flowchart showing the processing by an HD controller.

At step F301 of FIG. 13, the HD controller 31 waits for transfer of TOC data from the CD controller 21. That is, the HD controller 31 waits for the TOC data sent by the CD controller 21 at step F201 of FIG. 11.

When the TOC data is inputted, the HD controller 31 at step F302 searches the database stored in the HDD 32. That is, the HD controller 31 generates the identification information DID of FIG. 9 from the content of the inputted TOC data and uses the generated identification information DID to search the database to determine whether there is a database file having the same identification information DID recorded therein, of respective database files in the database.

A database file having the same identification information DID is found in the case where reproduction of the disc 90 currently loaded in the CD reproducing unit 2 was also carried out in the past and hence the database file for the disc 90 has already been prepared. On the other hand, a database file having the same identification information DID is not found in the case where reproduction of the disc 90 currently loaded in the CD reproducing unit 2 is now reproduced for the first time.

Thus, if the result of the search shows that there is no such database file, the HD controller 31 goes from step F303 to step F304. The HD controller 31 newly prepares a database file having the prepared identification information DID appended thereto and adds this database file to the database.

In that case, with respect to the disc 90 from which reproduction is to be carried out from now by the CD reproducing unit 2, none of the tracks has been dubbed yet. Therefore, at step F306, the all-track recording mode is set and the HD controller 31 is caused to be on standby for recording.

If such a database is found as a result of the search, the processing goes from step F303 to step F305 and the HD controller 31 confirms the recording flag of that database file. If the recording flag is off for all the tracks, none of the tracks has been dubbed yet with respect to the disc 90 from which reproduction is to be carried out from now by the CD reproducing unit 2. Therefore, the processing goes from step F305 to step F306. In this case, too, the all-track recording mode is set and the HD controller 31 is caused to be on standby for recording.

On the other hand, if the recording flag is on for all the tracks, all the tracks have already been dubbed with respect to the disc 90 from which reproduction is to be carried out from now by the CD reproducing unit 2 and dubbing is not necessary this time. Therefore, the processing goes from step F307 to step F308 and the HD controller 31 notifies the system controller 1 of the non-recording mode. The processing then ends.

If the recording flag is on for some of the tracks and the other tracks have not been dubbed yet, the processing goes from step F307 to step F309. The partial track recording mode is set and the HD controller 31 is caused to be on standby for recording.

In the case where the all-track recording mode is set at step F306 or the partial track recording mode is set at step F309 and the HD controller 31 is on standby for recording, the HD controller 31 at step F310 notifies the system controller 1 of the recording mode thus set and the recording standby status indicating the completion of the preparation for recording. In the case of notifying of the partial track recording mode, the track number as a recording target (track number for which the recording flag is off) is also notified of.

Figure 14:
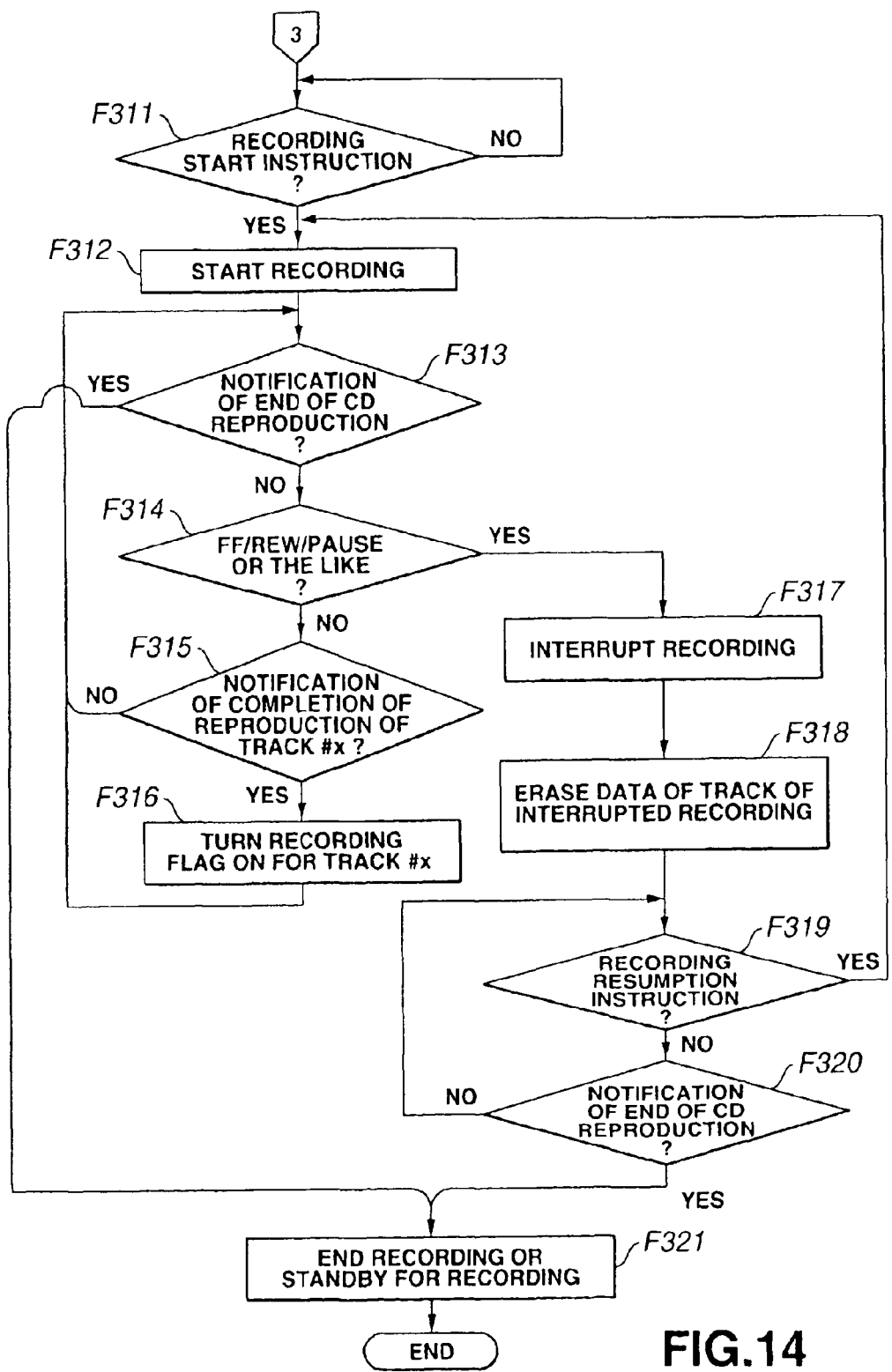
FIG. 14 is a flowchart showing the processing by the HD controller.

In the case of the all-track recording mode, the processing goes to step F311 of FIG. 14. In the case of the partial track recording mode, the processing goes to step F322 of FIG. 15.

First, the case of the all-track recording mode will be described.

The system controller 1 at step F104 of FIG. 10 waits for the notification given by the HD controller 31 at step F310 or step F308. As described above, if the system controller 1 is notified of the all-track recording mode from the HD controller 31, the system controller 1 at step F105 gives the recording start instruction to the HD controller 31.

The HD controller 31 at step F311 of FIG. 14 waits for the recording start instruction from the system controller 1, and at step F312, the HD controller 31 starts the recording operation in response to the recording start instruction. That is, in this case, since the system controller 1 (at step F106 of FIG. 10) instructs the CD reproducing unit 2 to start reproduction, the CD reproducing unit 2 starts reproduction at step F211 of FIG. 12 and the reproduced digital audio data S1 is inputted to the HD recording/reproducing unit 3. The HD controller 31 starts recording this inputted digital audio data S1 to the HDD 32.

After starting the recording operation, the HD controller 31 monitors the notification of the end of CD reproduction from the CD controller 21, the information of the special reproducing operation from the system controller 1, and the notification of the completion of the reproduction of the track #x from the CD controller 21, by using a loop of steps F313, F314 and F315.

Figure 12:
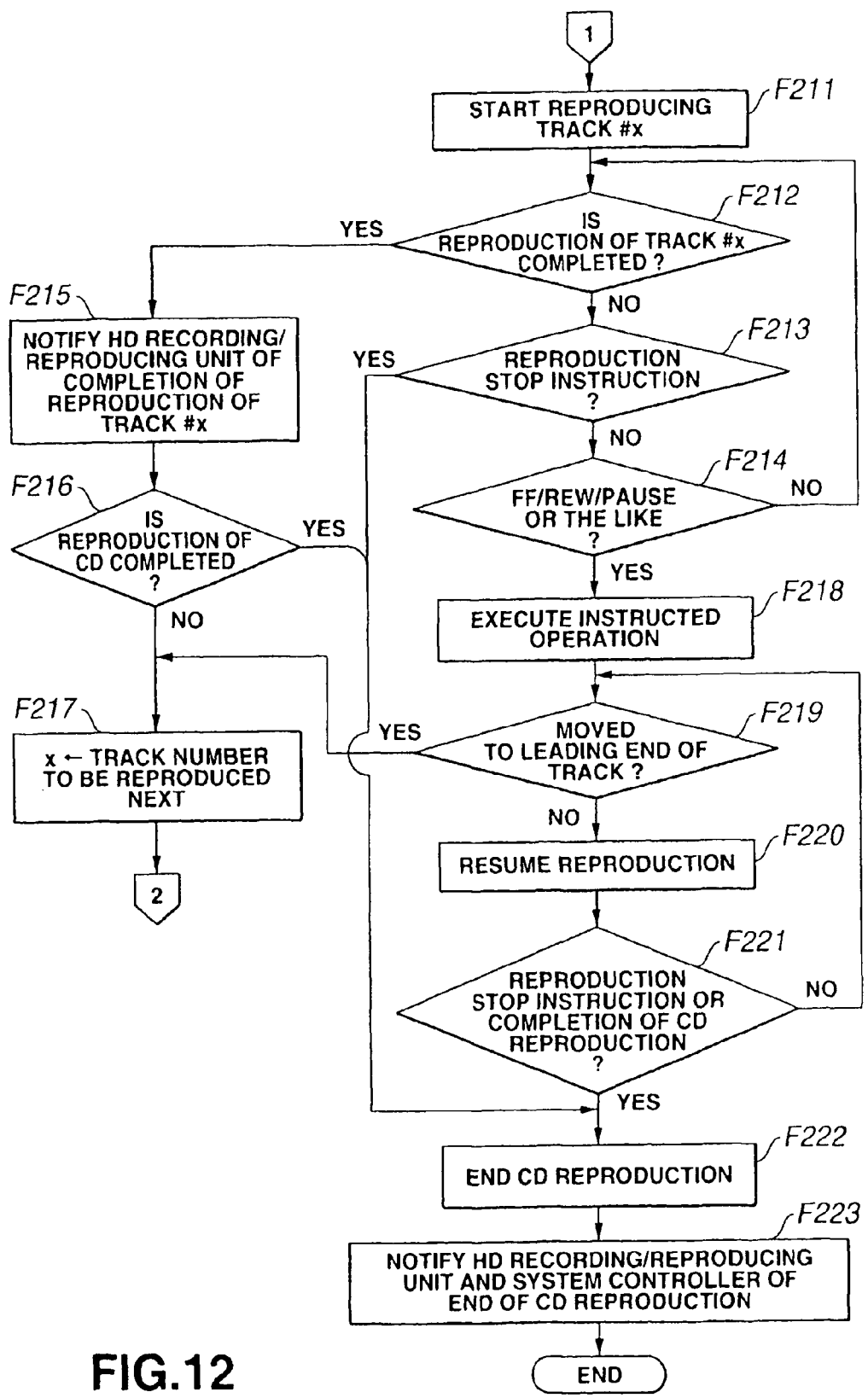
FIG. 12 is a flowchart showing the processing by the CD controller.

As is understood from the processing by the CD controller 21 shown in FIG. 12, only if a certain track was reproduced from the beginning to the end in the normal reproducing status by the CD reproducing unit 2, the CD controller 21 sends the notification of the completion of the reproduction of the track #x at step F215. This means the completion of the recording of the track #x to the HDD 32. Therefore, the processing goes from step F315 to step F316 and the HD controller 31 carries out processing to update the recording flag for the track #x to be turned on in the database file corresponding to the disc 90 which is currently being reproduced.

Since the operation to record the inputted digital audio data S1 to the HDD 32 is continued, the processing returns to the loop of steps F313, F314 and F315.

Although not shown in the flowchart, if a recording error is generated on the side of the HD recording/reproducing unit 3 during the recording of the track #x and the track #x cannot be correctly recorded, the recording flag will not turned on.

If the user carried out an operation such as FF, REW or the like, the CD reproducing unit 2 is caused to be in the special reproducing status such as fast-forward reproduction, as described above. In this case, the correct and continuous digital audio data S1 is not inputted to the HD recording/reproducing unit 3 and the track #x cannot be appropriately recorded. If the user carried out the operation such as FF, REW or the like, the operation information is sent from the system controller 1 (F110 shown in FIG. 10). As the HD controller 31 detects the operation information of the special reproduction at step F314, the processing goes to step F317 and the HD controller 31 interrupts the currently performed recording of the track #x to the HDD 32.

Moreover, at this point, since the recording of the track #x to the HDD 32 has been carried out to a halfway part, the HD controller 31 at step F318 erases the data of the track #x recorded to the halfway part to the HDD 32.

At step F319 or F320, the HD controller 31 waits for the recording resumption instruction or the notification of the completion of CD reproduction from the CD controller 21.

As described with reference to FIG. 12, in the case where the reproduction from step F221 ends before the normal reproduction reaches the leading end of a certain track after carrying out the fast-forward operation or the like in the CD reproducing unit 2, the CD controller 21 sends the notification of the end of CD reproduction at step F223.

In this case, the processing by the HD controller 31 goes from step F320 to step F321.

On the other hand, in the case where the normal reproduction reaches the leading end of a certain track after carrying out the fast-forward operation or the like in the CD reproducing unit 2, the processing by the CD controller 21 goes from step F219 to step F217 and then to step F205. The processing then goes to step F206 since the all-track recording mode is set in the HD recording/reproducing unit 3. In this case, since the HD recording/reproducing unit 3 is in the recording interrupted status, the CD controller 21 at step F207 gives the recording resumption instruction to the HD controller 31. Then, at step F211, reproduction is started at the leading end of the next track #x.

In this case, the processing by the HD controller 31 returns from step F319 to step F312 and recording is resumed. In short, the HD controller 31 records to the HDD 32 the digital audio data S1 which is inputted as the CD reproducing unit 2 reproduces the data from the leading end of a certain track.

When the reproduction is ended in the CD reproducing unit 2 by the stop operation by the user or by the completion of CD reproduction, the CD controller 21 sends the notification of the end of CD reproduction at step F223 of FIG. 12. As the HD controller 31 receives this notification at step F313 during the recording, the processing goes to step F321. Also in the case where the HD controller 31 receives the notification of the end of CD reproduction at step F320 during the recording interruption (standby), the processing goes to step F321.

At step F321, the HD controller 31 ends the recording or the recording standby status and end the series of processing.

The processing by the HD controller 31 in the case where the partial track recording mode is set by the processing of FIG. 13 will now be described with reference to FIG. 15.

If the response from the HD controller 31 is the partial track recording mode at step F104 of FIG. 10, the system controller 1 at step F106 gives the reproduction start instruction to the CD controller 21 and also notifies the CD controller 21 of the partial track recording mode and the recording target track.

Figure 15:
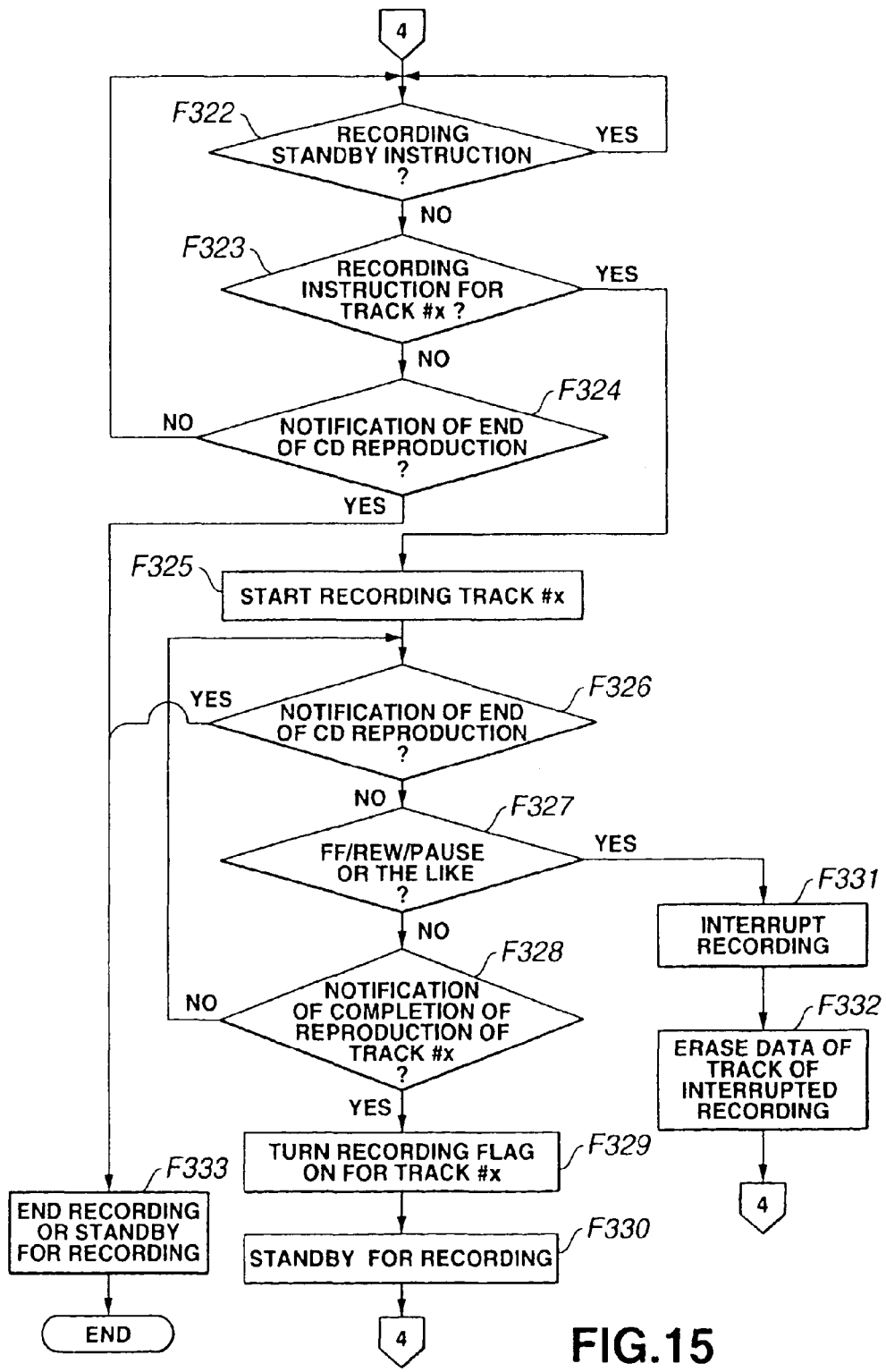
FIG. 15 is a flowchart showing the processing by the HD controller.

In this case, the HD controller 31 monitors the recording standby instruction, the recording instruction, or the notification of the end of CD reproduction from the CD controller 21, by using a loop of steps F322, F323 and F324 of FIG. 15

As described with reference to FIG. 11, if the partial track recording mode is set in the HD recording/reproducing unit 3, the CD controller 21 discriminates at step F208 whether or not the track #x to be reproduced from now is a recording target to the HDD 32, at every timing of starting the reproduction of a certain track. Then, the CD controller 21 sends the recording instruction (F209) or the recording standby instruction (F210) to the HD controller 31.

If the HD controller 31 received the recording instruction, the processing goes to step F323 to step F325 and the HD controller 31 starts the recording of the track #x to be reproduced to the HDD 32.

On the other hand, if the HD controller 31 received the recording standby instruction at step F322, the recording standby status is maintained and HD controller 31 waits for the notification of the end of CD reproduction or the recording instruction for the next track by using the loop of steps F322, F323 and F324.

For example, in the case where not the first tune but the second tune to be reproduced by the CD reproducing unit 2 is a recording target, the CD controller 21 gives the recording standby instruction to the HD controller 31 at the start of the reproduction of the first tune and gives the recording instruction at the start of the reproduction of the second tune. In that case, the HD controller 31 is on standby by using the loop of steps F322, F323 and F324 during the reproduction of the first tune. At the start of the reproduction of the second tune, the processing goes from step F323 to step F325 in response to the recording instruction and the HD controller 31 starts recording.

After starting the recording operation, the HD controller 31 monitors the notification of the end of CD reproduction from the CD controller 21, the information of the special reproducing operation from the system controller 1, and the notification of the completion of the reproduction of the track #x from the CD controller 21, by using a loop of steps F326, F327 and F328.

Only if the a certain track was reproduced from the beginning to the end in the normal reproducing status by the CD reproducing unit 2 in accordance with the processing by the CD controller 21 of FIG. 12, the CD controller 21 sends the notification of the completion of the reproduction of the track #x at step F215. In this case, it is assumed that the recording of the track #x as a recording target to the HDD 32 has been completed. Therefore, the processing by the HD controller 31 goes from step F328 to step F329 and the HD controller 31 carries out processing to update the recording flag for the track #x to be turned on in the database file corresponding to the disc 90 which is currently being reproduced. Then, on completion of the recording of the track #x designated by the CD controller 21, the HD controller 31 is caused to be in the recording standby status at step F330 and the processing returns to the loop of step of steps F322, F323 and F324.

Although not shown in the flowchart, in this case, too, if a recording error is generated on the side of the HD recording/reproducing unit 3 during the recording of the track #x and the track #x cannot be correctly recorded, the recording flag will not turned on.

Subsequently, the CD reproducing unit 2 proceeds to the reproduction of the next track. In this case, too, the recording instruction or the recording standby instruction is sent depending on the discrimination as to whether the track is a recording target or not. Therefore, the HD controller 31 starts recording at step F325 or is on standby for recording by using the loop of steps F322, F323 and F324, in accordance with the instruction.

If the user carried out an operation such as FF, REW or the like during the execution of the recording, the CD reproducing unit 2 is caused to be in the special reproducing status such as fast-forward reproduction, as described above. In this case, the correct and continuous digital audio data S1 is not inputted to the HD recording/reproducing unit 3. If the operation information of FF, REW or the like is sent from the system controller 1 (F110 shown in FIG. 10), the processing by the HD controller 31 goes from step F327 to step F331, and the HD controller 31 interrupts the currently performed recording of the track #x to the HDD 32 and is caused to be in the recording standby status.

At this point, since the recording of the track #x to the HDD 32 has been carried out to a halfway part, the HD controller 31 at step F332 erases the data of the track #x recorded to the halfway part to the HDD 32.

The processing returns to the loop of steps F322, F323 and F324 and the HD controller 31 waits for the next instruction or notification from the CD controller 21.

When the reproduction is ended in the CD reproducing unit 2 by the stop operation by the user or by the completion of CD reproduction, the CD controller 21 sends the notification of the end of CD reproduction at step F223 of FIG. 12. As the HD controller 31 receives this notification at step F326 during the recording, the processing goes to step F333. Also in the case where the HD controller 31 receives the notification of the end of CD reproduction at step F324 during the recording standby, the processing goes to step F333.

At step F333, the HD controller 31 ends the recording or the recording standby status and end the series of processing.

(10) Exemplary Dubbing Operation

A specific example of the dubbing operation realized through the processing carried out by the system controller 1, the CD controller 21 and the HD controller 31 as described above will now be described with reference to FIGS. 16 to 19.

To the operation shown in FIGS. 16 to 19, the step numbers are appended which correspond to the processing by the system controller 1, the CD controller 21 and the HD controller 31 described with reference to FIGS. 10 to 15, and these step numbers are also used in the description with reference to FIGS. 16 to 19.

[In the case where a CD is normally reproduced from the beginning to the end in the all-track recording mode]

Figure 16:
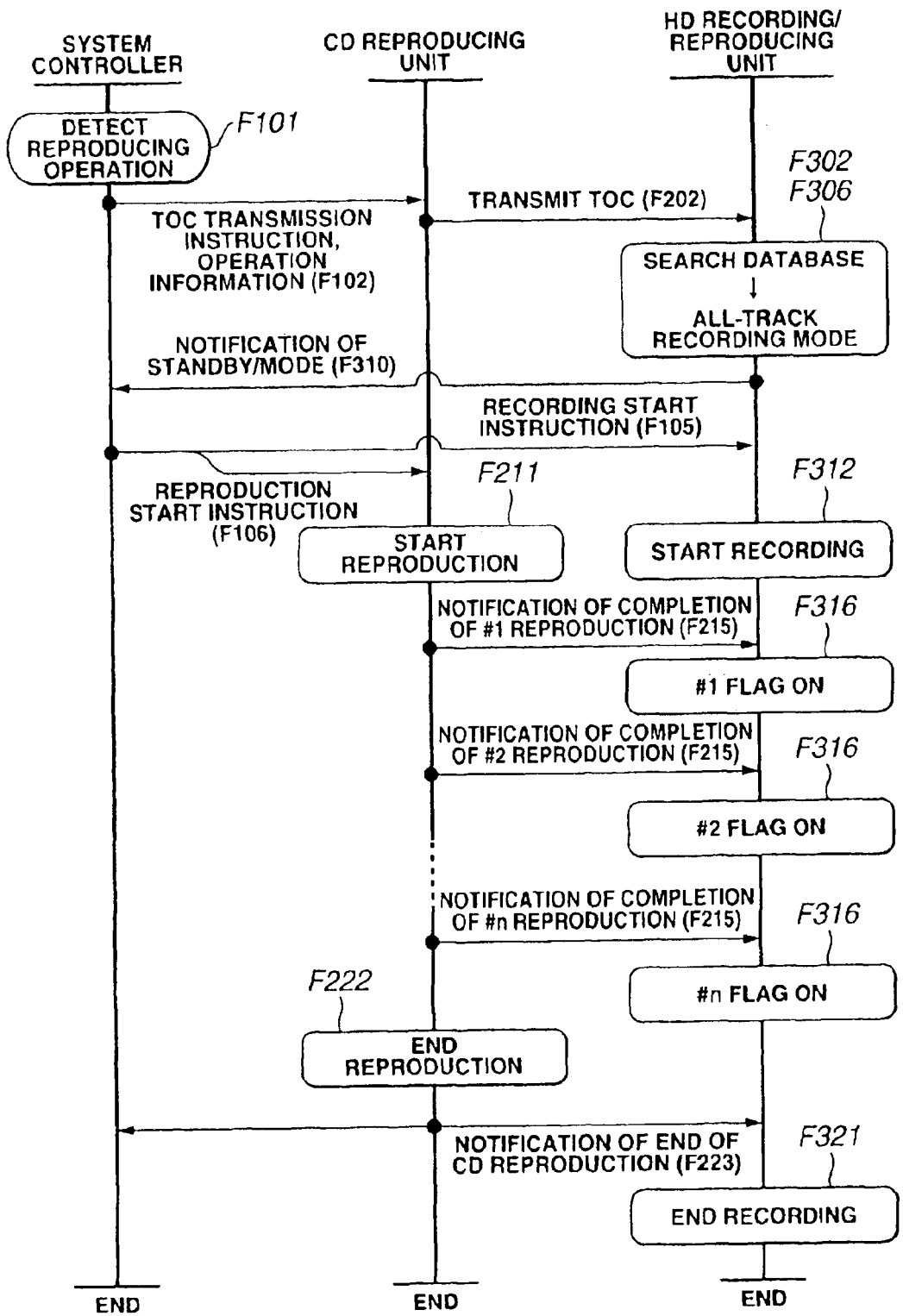
FIG. 16 is an explanatory view showing the operation at the time of an all-track recording mode.

In the exemplary operation shown in FIG. 16, the all-track recording mode is set in the HD controller 31 and all the tracks from the first track #1 to the last track #n of the disc 90 are normally reproduced in the CD reproducing unit 2. That is, the user designates the normal reproduction from the first tune and does not carry out an operation to set the special reproducing status such as FF during the reproduction.

As the system controller 1 detects the reproducing operation by the user (F101), the system controller 1 sends operation information and a TOC data transmission instruction to the CD reproducing unit 2 (CD controller 21) (F102).

In response to this, the CD controller 21 sends the TOC data of the disc 90 to the HD recording/reproducing unit 3 (HD controller 31) (F202).

On receiving the TOC data, the HD controller 31 searches the database (F302). In this case, if there is no database file with identification information DID, or if there is a database file with identification information DID but all the tracks are unrecorded, the all-track recording mode is set (F306).

The HD controller 31 gives a notification to the effect that it is in the recording standby status with the all-track recording mode, to the system controller 1 (F310).

In accordance with the response from the HD controller 31, the system controller 1 gives a recording start instruction to the HD controller 31 (F105) and also gives a reproduction start instruction and a notification of the all-track recording mode to the CD controller 21 (F106).

This causes the CD reproducing unit 2 to start reproduction (F211) and also causes the HD recording/reproducing unit 3 to start recording (F312).

When the reproduction of the track #1 is completed, the CD controller 21 sends a notification of the completion of the reproduction of the track #1 to the HD controller 31 (F215).

In response to this, the HD controller 31 turns on the recording flag corresponding to the track #1 on the database file corresponding to the disc 90 from which reproduction is being performed (F316).

When the reproduction of the track #2 is completed, the CD controller 21 sends a notification of the completion of the reproduction of the track #2 to the HD controller 31 (F215).

In response to this, the HD controller 31 turns on the recording flag corresponding to the track #2 on the database file corresponding to the disc 90 from which reproduction is being performed (F316).

Similarly, with respect to the subsequent tracks, in response to the completion of the reproduction of one track and the completion of the recording to the HDD 32, the HD controller 31 turns on the recording flag for the track.

When the reproduction of the last track #n is completed, the CD controller 21 sends a notification of the completion of the reproduction of the track #n to the HD controller 31 (F215), and the HD controller 31 turns on the recording flag corresponding to the track #n (F316). At this point, since the CD reproduction is completed, the CD reproducing unit 2 ends the reproduction (F222). Then, the CD controller 21 sends a notification of the end of CD reproduction to the HD controller 31 and the system controller 1 (F223).

In response to this, the HD controller 31 ends the recording (F321).

In this exemplary operation shown in FIG. 16, all the tracks reproduced from the disc 90 by the CD reproducing unit 2 are dubbed to the HDD 32 and the recording flags for all the tracks are turned on in the database file corresponding to the disc 90.

That is, dubbing from the CD is carried out without the user's awareness, and even if reproduction from the same CD is later carried out again, the non-recording mode will be set in the HD controller 31, thus preventing execution of unnecessary dubbing.

[In the case where the user carries out the stop operation during CD reproduction in the all-track recording mode]

Figure 17:
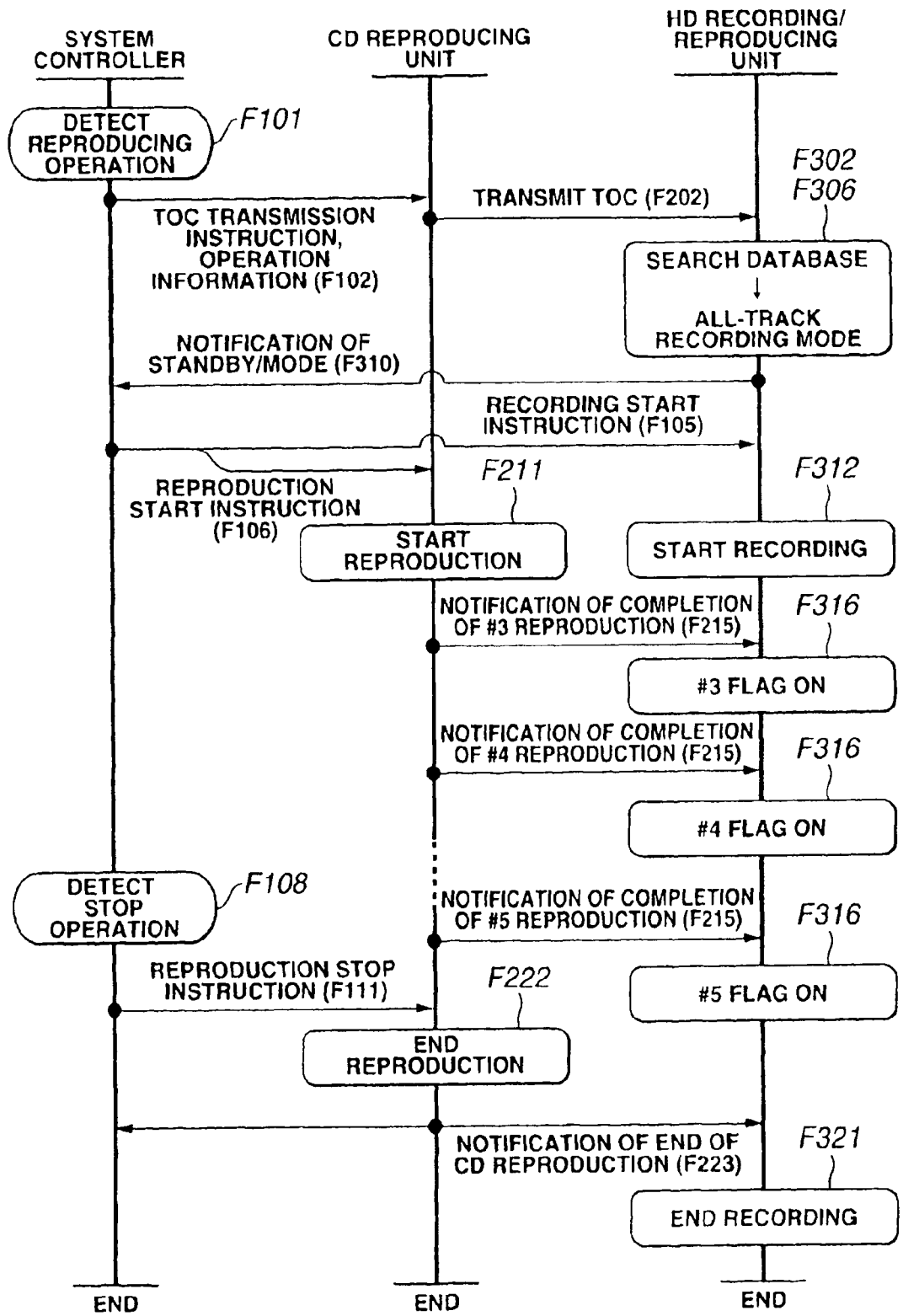
FIG. 17 shows the operation in the case where a stop operation is made at the time of the all-track recording mode.

In the exemplary operation shown in FIG. 17, the all-track recording mode is set in the HD controller 31 similarly to the above-described example, but the user carries out the reproduction stop operation during the reproduction from the disc 90 by the CD reproducing unit 2.

As the system controller 1 detects the reproducing operation by the user (F101), the system controller 1 sends operation information and a TOC data transmission instruction to the CD controller 21 (F102). However, if, for example, the user designates the reproduction from the track #3, the operation information to that effect is sent to the CD controller 21.

In response to the TOC data transmission instruction, the CD controller 21 sends the TOC data of the disc 90 to the HD controller 31 (F202).

On receiving the TOC data, the HD controller 31 searches the database (F302). In this case, if there is no database file with identification information DID, or if there is a database file with identification information DID but all the tracks are unrecorded, the all-track recording mode is set (F306).

The HD controller 31 gives a notification to the effect that it is in the recording standby status with the all-track recording mode, to the system controller 1 (F310).

In accordance with the response from the HD controller 31, the system controller 1 gives a recording start instruction to the HD controller 31 (F105) and also gives a reproduction start instruction and a notification of the all-track recording mode to the CD controller 21 (F106).

This causes the CD reproducing unit 2 to start reproduction (F211) and also causes the HD recording/reproducing unit 3 to start recording (F312). Since the user designated the reproduction from the track #3, the CD reproducing unit 2 carries out the reproduction from the track #3.

When the reproduction of the track #3 is completed, the CD controller 21 sends a notification of the completion of the reproduction of the track #3 to the HD controller 31 (F215).

In response to this, the HD controller 31 turns on the recording flag corresponding to the track #3 on the database file corresponding to the disc 90 from which reproduction is being performed (F316).

The CD controller 21 continuously carries out the reproduction, and when the reproduction of the track #4 is completed, the CD controller 21 sends a notification of the completion of the reproduction of the track #4 to the HD controller 31 (F215). In response to this, the HD controller 31 turns on the recording flag corresponding to the track #4 (F316).

The reproduction is continuously carried out, and when the reproduction of the track #5 is completed, the CD controller 21 sends a notification of the completion of the reproduction of the track #5 to the HD controller 31 (F215). In response to this, the HD controller 31 turns on the recording flag corresponding to the track #5 (F316).

The CD reproducing unit 2 continuously carries out the reproduction of the track #6, and the HD recording/reproducing unit 3 records the digital audio data S1 of the track #6 to the HDD 32. It is now assumed that the user carried out the stop operation during this time. As the system controller 1 detects the stop operation by the user (F108), the system controller 1 sends a reproduction stop instruction to the CD controller 21 (F111).

In response to this, the CD controller 21 ends the CD reproducing operation (F222) and sends a notification of the end of CD reproduction to the HD controller 31 and the system controller 1 (F223).

In response to this, the HD controller 31 ends the recording (F321).

In this exemplary operation shown in FIG. 17, the tracks #3, #4 and #5 reproduced from the disc 90 by the CD reproducing unit 2 are dubbed to the HDD 32 and the recording flags for the tracks #3, #4 and #5 are turned on in the database file corresponding to the disc 90. As for the track #6, even though the data is partly recorded, the recording is not reflected as the completion of the recording on the database file. Therefore, the track #6 is managed as not being dubbed.

Thus, if the reproduction from the same CD is later carried out again, the partial track recording mode will be set in the HD controller 31 and the tracks except for the tracks #3 #4 and #5 will be recording targets. Even if only the track #3 is reproduced many times, the track #3 will no longer be dubbed.

Although not shown in the processing by the HD controller 31 of FIGS. 13, 14 and 15, the data of the track recorded to a halfway part to the HDD 32 when the stop operation is carried out, for example, the data of the track #6 in the case of FIG. 17, may be erased from the HDD 32.

[In the case where the FF operation is carried out during CD reproduction in the all-track recording mode]

Figure 18:
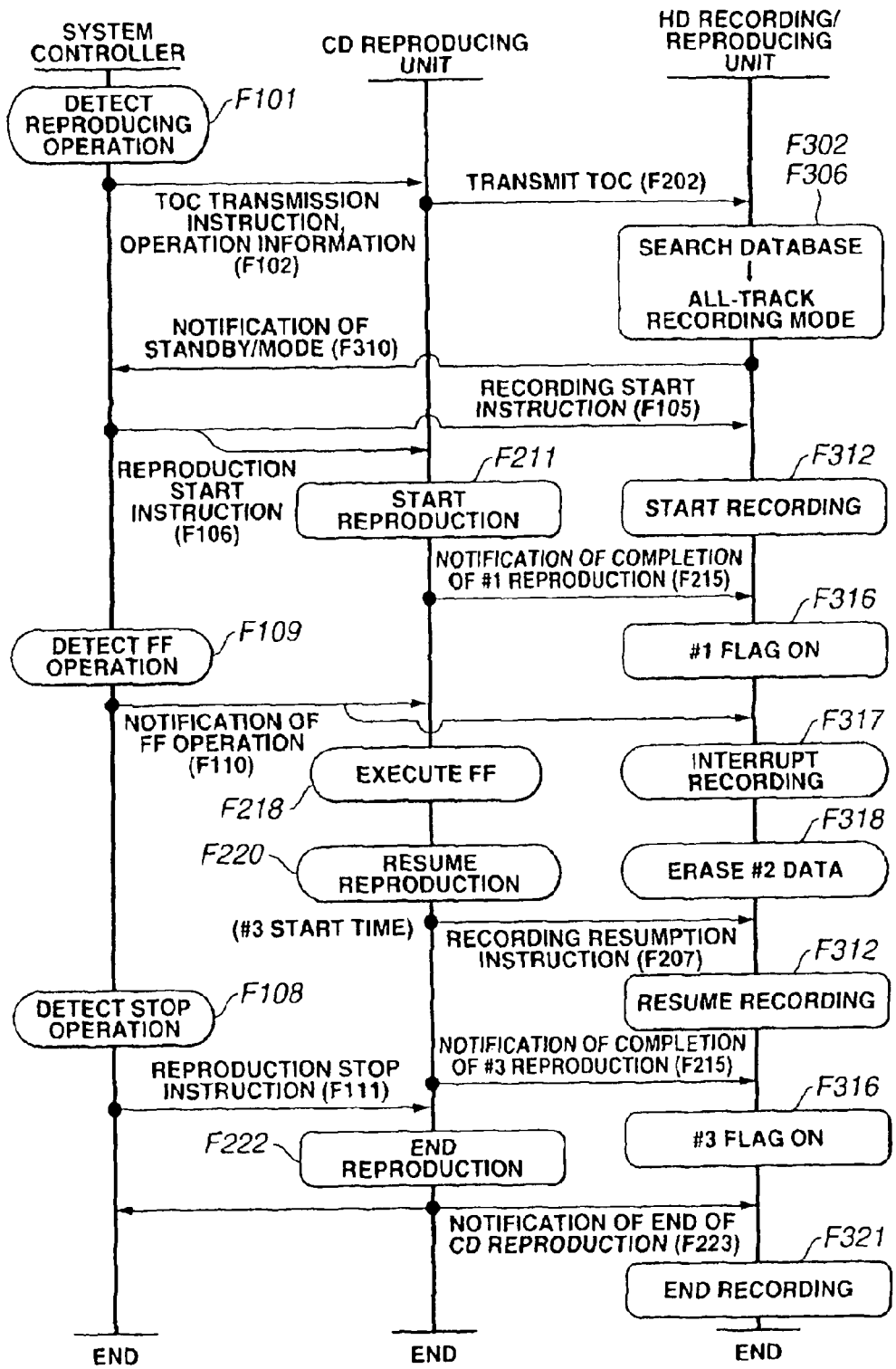
FIG. 18 shows the operation in the case where an FF operation is made at the time of the all-track recording mode.

In the exemplary operation shown in FIG. 18, the all-track recording mode is set in the HD controller 31 similarly to the above-described examples, but the user carries out the FF operation during the reproduction by the CD reproducing unit 2.

The operations up to the start of reproduction by the CD reproducing unit 2 and the start of recording by the HD recording/reproducing unit 3 after the user carries out the reproducing operation are the same as those in FIG. 16 and therefore will not be described further in detail.

After the CD reproducing unit 2 starts reproduction (F211) and the HD recording/reproducing unit 3 starts recording (F312), first, the CD controller 21 sends a notification of the completion of the reproduction of the track #1 to the HD controller 31 when the reproduction of the track #1 is completed (F215).

In response to this, the HD controller 31 turns on the recording flag corresponding to the track #1 on the database file corresponding to the disc 90 from which reproduction is being performed (F316).

After that, it is assumed that the user carried out the FF operation during the reproduction of the track #2 by the CD reproducing unit 2.

As the system controller 1 detects the FF operation by the user (F109), the system controller 1 sends the FF operation information to the CD controller 21 and the HD controller 31 (F110).

In response to this, the CD controller 21 executes fast-forward reproduction (F218) and resumes the normal reproduction after the fast-forward operation ends (F220).

The HD controller 31 interrupts the recording operation in response to the notification of the FF operation (F317). At this point, the track #2 has been recorded to a halfway part to the HDD 32. Therefore, the HD controller 31 erases the data of the track #2 to the halfway part from the HDD 32 (F318).

After the CD reproducing unit 2 ends the FF operation and restores the normal reproduction, when the reproduction reaches the leading end of the track #3, the CD controller 21 instructs the HD controller 31 to resume the recording (F207). In response to this, the HD controller 31 resumes the recording operation (F312). That is, the HD controller 31 starts recording the digital audio data S1 of the track #3 to the HDD 32.

After that, when the reproduction of the track #3 is completed, the CD controller 21 sends a notification of the completion of the reproduction of the track #3 to the HD controller 31 (F215).

In response to this, the HD controller 31 turns on the recording flag corresponding to the track #3 on the database file corresponding to the disc 90 from which reproduction is being performed (F316).

The CD reproducing unit 2 continuously carries out the reproduction of the track #4, and the HD recording/reproducing unit 3 records the digital audio data S1 of the track #4 to the HDD 32. It is now assumed that the user carried out the stop operation during this time. As the system controller 1 detects the stop operation by the user (F108), the system controller 1 sends a reproduction stop instruction to the CD controller 21 (F111).

In response to this, the CD controller 21 ends the CD reproducing operation (F222) and sends a notification of the end of CD reproduction to the HD controller 31 and the system controller 1 (F223).

In response to this, the HD controller 31 ends the recording (F321).

In this exemplary operation shown in FIG. 18, of the tracks #1, #2, #3 and #4 reproduced from the disc 90 by the CD reproducing unit 2, only the tracks #1 and #3 that are completely reproduced in the normal status are dubbed to the HDD 32. That is, the recording flags only the tracks #1 and #3 are turned on in the database file corresponding to the disc 90.

As for the track #2 for which fast-forward was carried out from its halfway part, and the track #4 which was stopped at its halfway part, the recording is not reflected as the completion of the recording on the database file. Therefore, the tracks #2 and #4 are managed as not being dubbed.

Thus, if the reproduction from the same CD is later carried out again, the partial track recording mode will be set in the HD controller 31 and the tracks except for the tracks #1 and #3 will be recording targets. Even if only the track #3 is reproduced many times, the track #3 will no longer be dubbed.

[In the case where tracks #1 and #4 are recording targets in the partial track recording mode]

Figure 19:
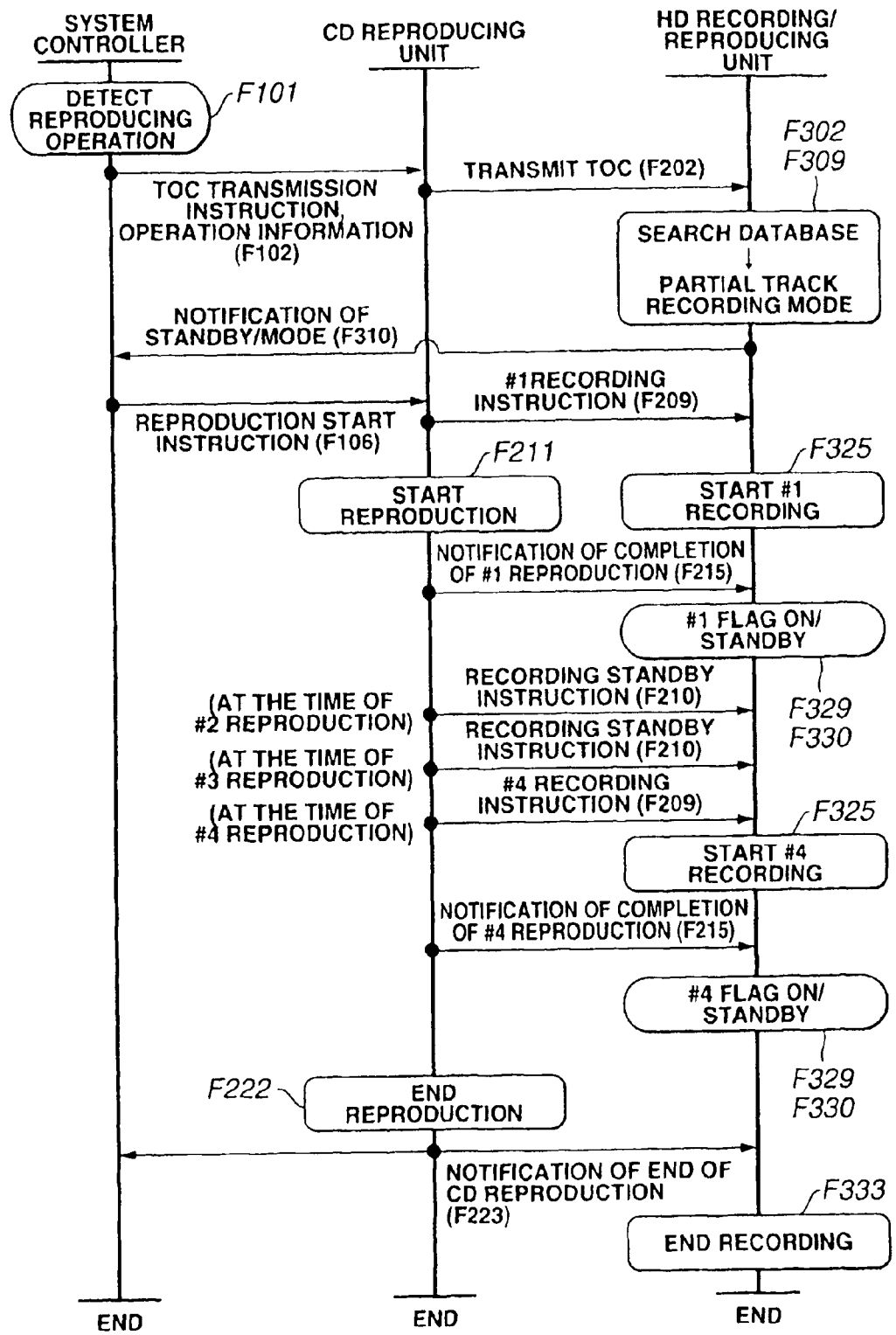
FIG. 19 shows the operation at the time of a partial track recording mode.

In the exemplary operation shown in FIG. 19, the partial track recording mode is set in the HD controller 31. For example, it is assumed that four tunes of tracks #1 to #4 are recorded on the currently loaded CD and that the tracks #2 and #3 were recorded to the HDD 32 in the past. The user carries out an operation to normally reproduce from the first tune on this CD and all the tracks from the first track #1 to the last track #4 on the CD 90 are normally reproduced by the CD reproducing unit 2.

As the system controller 1 detects the reproducing operation by the user (F101), the system controller 1 sends operation information and a TOC data transmission instruction to the CD reproducing unit 2 (CD controller 21) (F102).

In response to this, the CD controller 21 sends the TOC data of the disc 90 to the HD recording/reproducing unit 3 (HD controller 31) (F202).

On receiving the TOC data, the HD controller 31 searches the database (F302). In this case, there is a database file with identification information DID and the recording flags for the tracks #2 and #3 are on in the database file.

Thus, the HD controller 31 sets the partial track recording mode (F306), and gives the system controller 1 a notification to the effect that the HD controller 31 is in the recording standby status with the partial track recording mode and that recording target tracks are the tracks #1 and #4 (F310).

In accordance with the response from the HD controller 31, the system controller 1 gives a reproduction start instruction to the CD controller 21 (F106). At this point, the system controller 1 also gives the CD controller 21 a notification to the effect that the partial track recording mode is set in the HD controller 31 and that recording target tracks are the tracks #1 and #4.

Since the track #1 which is to be reproduced first is a recording target, the CD controller sends a recording instruction for the track #1 to the HD controller 31 (F209).

The CD reproducing unit 2 starts reproduction at the track #1 (F211) and the HD recording/reproducing unit 3 starts recording in response to the recording instruction (F325).

When the reproduction of the track #1 is completed, the CD controller 21 sends a notification of the completion of the reproduction of the track #1 to the HD controller 31 (F215).

In response to this, the HD controller 31 turns on the recording flag corresponding to the track #1 on the database file corresponding to the disc 90 from which reproduction is being performed (F329). Then, the HD controller 31 enters the recording standby status (F330).

When starting the reproduction of the track #2, the CD controller 21 gives a recording standby instruction to the HD controller 31 because the track #2 is not a recording target (F210). Therefore, the HD recording/reproducing unit 3 does not record the track #2.

Similarly, at the start of the reproduction of the track #3, the CD controller 21 gives a recording standby instruction to the HD controller 31 because the track #3 is not a recording target (F210). Therefore, the HD recording/reproducing unit 3 does not record the track #3.

When starting the reproduction of the track #4, the CD controller 21 gives a recording instruction to the HD controller 31 because the track #4 is a recording target (F209). Therefore, the HD recording/reproducing unit 3 starts recording the track #4 (F325). After that, when the reproduction of the track #4 is completed, the CD controller 21 sends a notification of the completion of the reproduction of the track #4 to the HD controller 31 (F215). The HD controller 31 turns on the recording flag corresponding to the track #4 (F329) and then enters the recording standby status (F330).

At this point, since the CD reproduction is completed, the CD reproducing unit 2 ends the reproduction (F222). The CD controller 21 sends a notification of the end of CD reproduction to the HD controller 31 and the system controller 1

(F223). In response to this, the HD controller 31 ends the recording standby status and ends the processing (F333).

As in the exemplary operation shown in FIG. 19, in the case of the partial track recording mode, only the tracks that have not been dubbed to the HDD 32, of the tracks reproduced from the disc 90 by the CD reproducing unit 2, are dubbed.

In the case of the partial track recording mode, too, if the FF operation or the stop operation is carried out during the reproduction, the operation similar to the operation described with reference to FIGS. 17 and 18 is carried out accordingly.

The embodiment of the present invention is described above. According to the present invention, when reproducing data from a CD (disc 90), the data is automatically dubbed to the HDD 32. However, with respect to each track to be reproduced, the recording flag recorded in the database file is referred to and dubbing is performed only for a track which has not been dubbed yet.

Therefore, as the user reproduces data from a CD without being aware of the dubbing operation, the tracks recorded on the CD will be automatically saved into the HDD and no duplicate dubbing of the same tune will be performed.

A track for which the special reproduction is performed or which is stopped during the reproduction is considered not to be dubbed. Therefore, the track will be dubbed at a later opportunity. In short, the complete track data is accumulated on the HDD 32.

Such an HDD 32 is automatically formed as a music server without the user's awareness. Therefore, with respect to a CD which was reproduced once, the user can enjoy reproducing the tunes from the HDD 32 without loading the CD.

(11) Other Examples

The present invention is not limited to the exemplary structure and the exemplary operations in the above-described embodiment, and various modifications may be considered.

For example, in the case of the partial track recording mode, though whether each track is to be dubbed or not is determined on the side of the CD controller 21 in the above-described example, it may be determined by the HD controller 31.

That is, the HD controller 31 can discriminate the currently inputted tack number if the HD controller 31 constantly receiving the information of the tack number (that is, subcode information) together with the digital audio data. S1 from the CD reproducing unit 2. Therefore, the HD controller 31 can discriminate whether or not the inputted digital audio data S1 is data of a recording target track, and may select execution of recording or standby in accordance with the result of the discrimination.

The notifications and instructions transmitted between the system controller 1, the CD controller 21 and the HD controller 31 in the above-described processing are simply some examples and which controller sends or receives the notifications and instructions may be appropriately changed in accordance with the actual structure.

For example, the system controller 1 may monistically manage all the operations so as to control the CD reproduction and the recording to the HDD 32.

The storage for the database is not limited to the HDD 32 and may be a non-volatile memory or the like.

The identification information DID for identifying each CD is not limited to the information formed from the TOC data and may be additional information or the manufacture number of the CD.

In the above-described embodiment, the dubbing device in which the CD reproducing unit and the HD recording/reproducing unit 3 are integrally provided is used. However, the dubbing device may also be formed by providing these units as separate equipments and connecting them to enable dubbing.

The first recording medium is not limited to a CD and may be an MD, a memory card, a DAT or the like. Similarly, the second recording medium is not limited to an HDD and may be a solid-state memory, another type of disc-like medium, or a tape-like medium.

INDUSTRIAL APPLICABILITY

According to the present invention, when data is reproduced from the portable first recording medium, the data is dubbed to the large-capacity second recording medium. Particularly, when the data is reproduced from the first recording medium, the database means is searched on the basis of the identification information for the first recording medium, and execution control of dubbing is carried out in accordance with the result of the recording history information found by the search. For example, whether the data to be reproduced from the first recording medium has already been recorded to the second recording medium or not is discriminated, and if the data to be reproduced has not been recorded to the second recording medium, dubbing is carried out.

Therefore, as the user reproduced data from the first recording medium such as a CD without being aware of the dubbing operation, the data is dubbed to the second recording medium such as an HDD. This improves the convenience and eliminates any failure in the operation by the user. Particularly, by not performing dubbing in the case where the data has already been dubbed, unnecessary consumption of the capacity of the second recording medium can be avoided.

Since the second recording medium has a large capacity, it rarely occurs that the remaining capacity might be insufficient for the use by the user because of automatic dubbing. In this respect, no inconvenience for the user occurs. Since tunes and the like are saved to the second recording medium such as an HDD without the user's awareness, for example, music server can be automatically prepared and arbitrarily used. In this respect, the convenience for the user is improved.

As the identification information of the first recording medium in the database is generated on the basis of management information for managing the program in the first recording medium, for example, on the basis of TOC data, each CD as the first recording medium can be correctly identified and the appropriate dubbing operation can be realized.

Since the recording history information stored in the database is information indicating whether or not each program has been recorded to the second recording medium, whether to execute automatic dubbing of each program (track such as tune) can be discriminated and the dubbing operation with no waste can be thus realized.

Moreover, if a whole program was recorded to the second recording medium, the content of the recording history information is updated to assume that the program has been recorded. Thus, it is possible determine only the data that could be completely dubbed, as having been dubbed. For example, if the user reproduced a certain tune from a CD or the like only to a halfway part, the tune can be dubbed to the halfway part to the second recording medium. By assuming such data as not having been dubbed, it is possible to wait for a later opportunity for dubbing and to appropriately save only the tune that could be completely dubbed, on the second recording medium.

Also, if the special reproducing status such as FF is set during the reproduction of the first recording medium such as a CD, complete data cannot be recorded on the side of the second recording medium. In that case, however, by stopping the dubbing operation and erasing the data left in the incomplete status, it is possible to prevent the incomplete dubbed data from being left and to prevent unnecessary dubbing.

Moreover, as additional information corresponding to the first recording medium is recorded to the database, various uses are possible, for example, recording various information related to the first recording medium from which dubbing was performed and presenting the various information to the user.

The invention claimed is:

1. A method for recording programs from a first recording medium to a second recording medium, said method comprising:
   providing a database of (a) identification information corresponding to respective first recording media and (b) recording history information representing (i) programs on a respective first recording medium that are recorded to the second recording medium and (ii) programs on said respective first recording medium that are not recorded to the second recording medium,
   updating the recording history information in the database when the recording of a program is completed, and
   wherein the database is searched to determine if a program has previously been recorded from the first recording medium to the second recording medium and, after said search has been made, if it is determined that said program has not previously been recorded to the second recording medium, to reproduce said program from the first recording medium and to record the reproduced program to the second recording medium.

2. A method for recoding programs from a first recording medium to a second recording medium, said method comprising:
   providing a database of (a) identification information corresponding to respective first recording media and (b) recording history information representing (i) programs on a respective first recording medium that are recorded to the second recording medium and (ii) programs on said respective first recording medium that are not recorded to the second recording medium,
   updating the recording history information in the database when the recording of a program is completed, and
   wherein programs are reproduced from said first recording medium in a normal reproducing mode, said reproducing mode being selectively changed over to a special reproducing mode, whereupon the recording operation of the program to the second recording medium is stopped and data of the program which was recorded before the stopping of the recording operation is erased.

3. Apparatus configured to record programs from a first recording medium to a second recording medium, comprising:
   a database of (a) identification information corresponding to respective first recording media and (b) recording history information representing (i) programs on a respective first recording medium that are recorded to the second recording medium and (ii) programs on said respective first recording medium that are not recorded to the second recording medium,
   a controller configured to update the recording history information in the database when the recording of a program is completed, and
   wherein the database is searched to determine if a program has previously been recorded from the first recording medium to the second recording medium and, after said search has been made, if it is determined that said program has not previously been recorded to the second recording medium, the controller reproduces said program from the first recording medium and records the reproduced program to the second recording medium.

4. Apparatus configured to record programs from a first recording medium to a second recording medium, comprising:
   a database of (a) identification information corresponding to respective first recording media and (b) recording history information representing (i) programs on a respective first recording medium that are recorded to the second recording medium and (ii) programs on said respective first recording medium that are not recorded to the second recording medium,
   a controller configured to update the recording history information in the database when the recording of a program is completed, and
   wherein programs are reproduced from said first recording medium in a normal reproducing mode, said reproducing mode being selectively changed over to a special reproducing mode, whereupon the controller stops the recording operation of the program to the second recording medium and erases data of the program which was recorded before the stopping of the recording operation.

* * * * *